United States Patent
Takada et al.

(10) Patent No.: US 10,232,741 B2
(45) Date of Patent: Mar. 19, 2019

(54) SEAT DRIVE DEVICE

(71) Applicant: TOYOTA BOSHOKU KABUSHIKI KAISHA, Aichi-ken (JP)

(72) Inventors: Yoichi Takada, Aichi-ken (JP); Yuji Arakawa, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/866,913

(22) Filed: Jan. 10, 2018

(65) Prior Publication Data
US 2018/0201159 A1 Jul. 19, 2018

(30) Foreign Application Priority Data
Jan. 19, 2017 (JP) .................. 2017-007277

(51) Int. Cl.
*B60N 2/02* (2006.01)
*B60N 2/16* (2006.01)
*B60N 2/22* (2006.01)

(52) U.S. Cl.
CPC ......... *B60N 2/0252* (2013.01); *B60N 2/0228* (2013.01); *B60N 2/0232* (2013.01); *B60N 2/0296* (2013.01); *B60N 2/165* (2013.01); *B60N 2/2213* (2013.01); *B60N 2/1615* (2013.01); *B60N 2002/0236* (2013.01)

(58) Field of Classification Search
CPC .. B60N 2/0252; B60N 2/0228; B60N 2/0232; B60N 2/0296; B60N 2/165; B60N 2/2213; B60N 2/1615; B60N 2002/0236
See application file for complete search history.

(56) References Cited

U.S. PATENT DOCUMENTS

| | | | | |
|---|---|---|---|---|
| 5,009,296 | A * | 4/1991 | Ohkawa ............... | B60N 2/0232 192/20 |
| 5,163,734 | A * | 11/1992 | Hakansson .......... | B60N 2/0296 248/396 |
| 5,882,075 | A * | 3/1999 | Partington ........... | B60N 2/0228 297/344.13 |
| 6,553,866 | B1 * | 4/2003 | Ursel ................... | B60N 2/0224 297/330 |
| 9,267,589 | B2 * | 2/2016 | Shigematsu ......... | B60N 2/0296 |
| 9,616,783 | B2 * | 4/2017 | Ito ........................ | B60N 2/0296 |
| 2012/0319445 | A1 * | 12/2012 | Zolno .................. | B60N 2/0232 297/338 |
| 2014/0238188 | A1 | 8/2014 | Ito | |

(Continued)

FOREIGN PATENT DOCUMENTS

JP 2013-107624 6/2013

*Primary Examiner* — Philip F Gabler
(74) *Attorney, Agent, or Firm* — Greenblum & Bernstein, P.L.C.

(57) ABSTRACT

A seat drive device, wherein one of first and second operation restricting portions corresponding to one of first and second transmission members is movable within one of first and second notches corresponding to another of the first and second transmission members when the one of the first and second transmission members is rotated from an initial state where both of the first and second transmission members are not rotated, and the first and second operation restricting portions are arranged to interfere with each other when both of the first and second transmission members are simultaneously rotated.

6 Claims, 16 Drawing Sheets

(56) References Cited

U.S. PATENT DOCUMENTS

| | | | |
|---|---|---|---|
| 2017/0334314 A1* | 11/2017 | Takada | B60N 2/0232 |
| 2018/0029505 A1* | 2/2018 | Ito | |
| 2018/0029508 A1* | 2/2018 | Carl | |
| 2018/0194250 A1* | 7/2018 | Arakawa | |
| 2018/0304772 A1* | 10/2018 | Arakawa | |

* cited by examiner

SEAT DRIVE DEVICE

CROSS-REFERENCE TO RELATED APPLICATIONS

This application claims priority from Japanese Patent Application No. 2017-007277 filed on Jan. 19, 2017, the entire contents of which are incorporated herein by reference.

TECHNICAL FIELD

The disclosure relates to a seat drive device for selectively actuating a plurality of position adjustment mechanisms by a single motor.

BACKGROUND

A seat drive device for selectively actuating a plurality of position adjustment mechanisms by a single motor is disclosed in JP-A-2013-107624. According to such a seat drive device, four position adjustments (the front-rear adjustment and up-down adjustment of a seat, the reclining angle adjustment of a seat back, and the tilt angle adjustment of a seat cushion) can be performed by using a single motor. Therefore, a clutch mechanism is provided in each path for distributing the output of the motor to each position adjustment mechanism. Then, by setting a clutch corresponding to a mechanism that performs the position adjustment to a connected state, the output of the motor is transmitted to the corresponding position adjustment mechanism. On the other hand, by setting a clutch corresponding to a mechanism that does not perform the position adjustment to a non-connected state, the output of the motor is not transmitted to the corresponding position adjustment mechanism.

Although each position adjustment mechanism is individually operated in principle, a plurality of position adjustment mechanisms can be simultaneously operated depending on the manner of operation. However, the specification of the motor is determined on the premise that it operates one position adjustment mechanism. Therefore, when a plurality of position adjustment mechanisms is simultaneously operated, there is a problem that the motor is overloaded and the operation speed is lowered.

SUMMARY

The disclosure provides a seat drive device in which a plurality of position adjustment mechanisms is selectively actuated by a single motor and which prevents a plurality of position adjustment mechanisms from being simultaneously actuated by making it unable to perform an operation of simultaneously actuating a plurality of position adjustment mechanisms.

According to an aspect of the disclosure, there is provided a seat drive device including: a motor having a single output shaft; a first position adjustment mechanism configured to receive an output of the motor and adjust a position of a first moving portion that is one of a plurality of seat moving portions; a second position adjustment mechanism configured to receive an output of the motor and adjust a position of a second moving portion that is one of the plurality of seat moving portions and is different from the first moving portion; a first operation member disposed corresponding to the first position adjustment mechanism and configured to be operated to move from an original position to an adjustment position when actuating the first position adjustment mechanism; a second operation member disposed corresponding to the second position adjustment mechanism and configured to be operated to move from an original position to an adjustment position when actuating the second position adjustment mechanism; a first clutch mechanism disposed corresponding to the first position adjustment mechanism and configured to selectively connect an output shaft of the first clutch mechanism which is connected to the first position adjustment mechanism and an input shaft of the first clutch mechanism which is configured to be rotated by the motor; a second clutch mechanism disposed corresponding to the second position adjustment mechanism and configured to selectively connect an output shaft of the second clutch mechanism which is connected to the second position adjustment mechanism and an input shaft of the second clutch mechanism which is configured to be rotated by the motor; a switch configured to energize the motor with a polarity corresponding to a direction of each operation of the first operation member and the second operation member in accordance with the each operation of the first operation member and the second operation member; a first transmission member provided in a path for transmitting an operating force of the first operation member to the first clutch mechanism and configured to transmit the operating force in response to the first operation member being operated to move from the original position to the adjustment position; a second transmission member provided in a path for transmitting an operating force of the second operation member to the second clutch mechanism and configured to transmit the operating force in response to the second operation member being operated to move from the original position to the adjustment position; a first operation restricting portion provided to the first transmission member and configured to, in a state where the first operation member has been operated to move from the original position to the adjustment position and the first transmission member has been operated to move in response thereto, restrict the second position adjustment mechanism from being actuated in response to the second operation member being operated to move from the original position to the adjustment position; and a second operation restricting portion provided to the second transmission member and configured to, in a state where the second operation member has been operated to move from the original position to the adjustment position and the second transmission member has been operated to move in response thereto, restrict the first position adjustment mechanism from being actuated in response to the first operation member being operated to move from the original position to the adjustment position, wherein both the first transmission member and the second transmission member are rotating bodies which are arranged adjacent to each other, wherein a first notch is provided to a rotating outer peripheral surface of the first transmission member adjacent to the second transmission member by partially cutting the rotating outer peripheral surface of the first transmission member, and the first operation restricting portion is provided to the rotating outer peripheral surface of the first transmission member adjacent to the first notch, wherein a second notch is provided to a rotating outer peripheral surface of the second transmission member adjacent to the first transmission member by partially cutting the rotating outer peripheral surface of the second transmission member, and the second operation restricting portion is provided to the rotating outer peripheral surface of the second transmission member adjacent to the second notch, the second notch facing the first notch, wherein the first operation restricting portion and the second operation restricting portion are moved in accordance with the rotation of the first transmission member and the second transmission member and are arranged such that moving trajectories of the first operation restricting portion and the second operation restricting portion overlap with each other, and wherein one of the first and second operation restricting portions corresponding to one of the first and second transmission members is movable within one of the first and second notches corresponding to another of the first and second transmission members when the one of the first and second transmission members is rotated from an initial state where both of the first and second transmission members are not rotated, and the first and second operation restricting portions are arranged to interfere with each other when both of the first and second transmission members are simultaneously rotated.

DETAILED DESCRIPTION

FIGS. 1 to 10 show a first embodiment of the disclosure. The first embodiment represents an example in which the seat drive device of the disclosure is applied to a vehicle front seat (hereinafter, simply referred to as a "seat") 6. In each drawing, respective directions in the state where the seat 6 is mounted to a vehicle are indicated by arrows. In the following, the descriptions relating to the directions will be made based on these directions.

Figure 1:
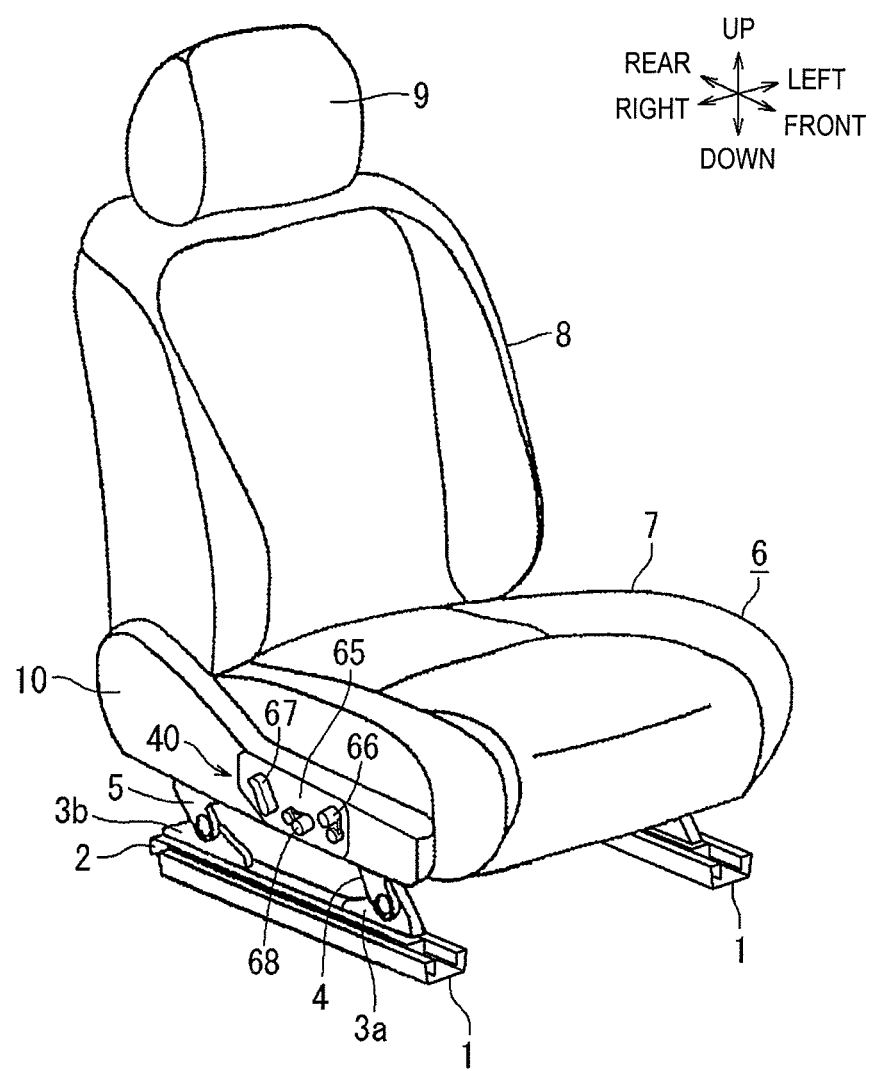
FIG. 1 is a perspective view of a vehicle front seat to which a seat drive device according to a first embodiment of the disclosure is applied.

FIG. 1 shows an appearance of the seat 6. In the seat 6, a seat back 8 forming a backrest is fixed to the rear side of a seat cushion 7 forming a seating part so as to freely rotate back and forth. Therefore, a recliner (not shown) for adjusting a reclining angle of the seat back 8 is provided at a hinge portion between a rear portion of the seat cushion 7 and a lower portion of the seat back 8. Further, a headrest 9 for supporting a head part of a seated occupant from the rear is provided at an upper end portion of the seat back 8.

The seat 6 is fixed to a vehicle floor so as to freely move back and forth. Therefore, on the vehicle floor, a pair of lower rails 1 is fixed to the lower sides of both left and right end portions of the seat cushion 7. Then, upper rails 2 are respectively fitted into the lower rails 1 and are slidable in a front and rear direction with respect to the lower rails 1.

Brackets 3a, 3b are fixed on each of the upper rails 2, respectively. The seat cushion 7 is fixed on the brackets 3a, 3b via a front link 4 and a rear link 5, respectively. The front link 4 and the rear link 5 are tiltable in the front and rear direction with respect to the brackets 3a, 3b. Therefore, the height of the seat 6 from the vehicle floor can be adjusted (lifter adjustment) by the angle adjustment of the front link 4 and the rear link 5.

In this way, the seat 6 is configured to perform the reclining angle adjustment, the slide adjustment and the lifter adjustment. The seat 6 is a so-called 6-way power seat. Although not shown, a reclining angle adjustment mechanism for performing the reclining angle adjustment is provided in a recliner below the seat back 8. Further, a slide adjustment mechanism for performing the slide adjustment is provided above the upper rail 2. Furthermore, a lifter adjustment mechanism for performing the lifter adjustment is provided above the rear link 5.

A right portion of the seat cushion 7 and a lower portion of the seat back 8 are covered with a side shield 10. A driving device 40 for the seat drive device is accommodated in the side shield 10. The driving device 40 can adjust the positions of a plurality of seat moving portions according to the preference of an occupant seated on the seat 6. A slide operation knob 66, a lifter operation knob 68 and a recliner operation knob 67 forming an operation member of the driving device 40 are provided to be exposed to the outside of the side shield 10 so that they can be operated by the seated occupant. The slide operation knob 66, the lifter operation knob 68 and the recliner operation knob 67 correspond to the first or second operation member in the disclosure.

Figure 3:
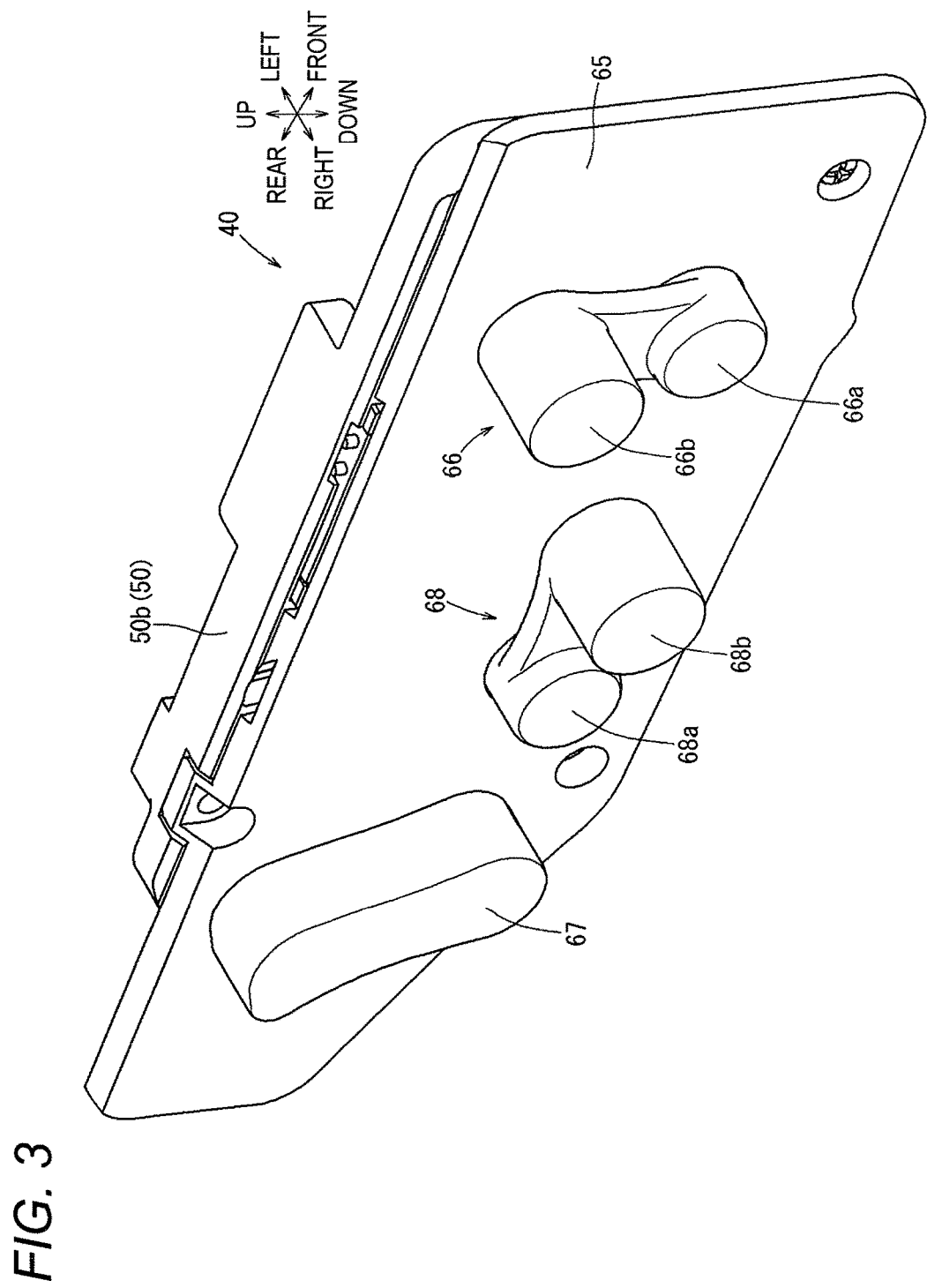
FIG. 3 is an enlarged perspective view of a main part of the first embodiment.
Figure 10:
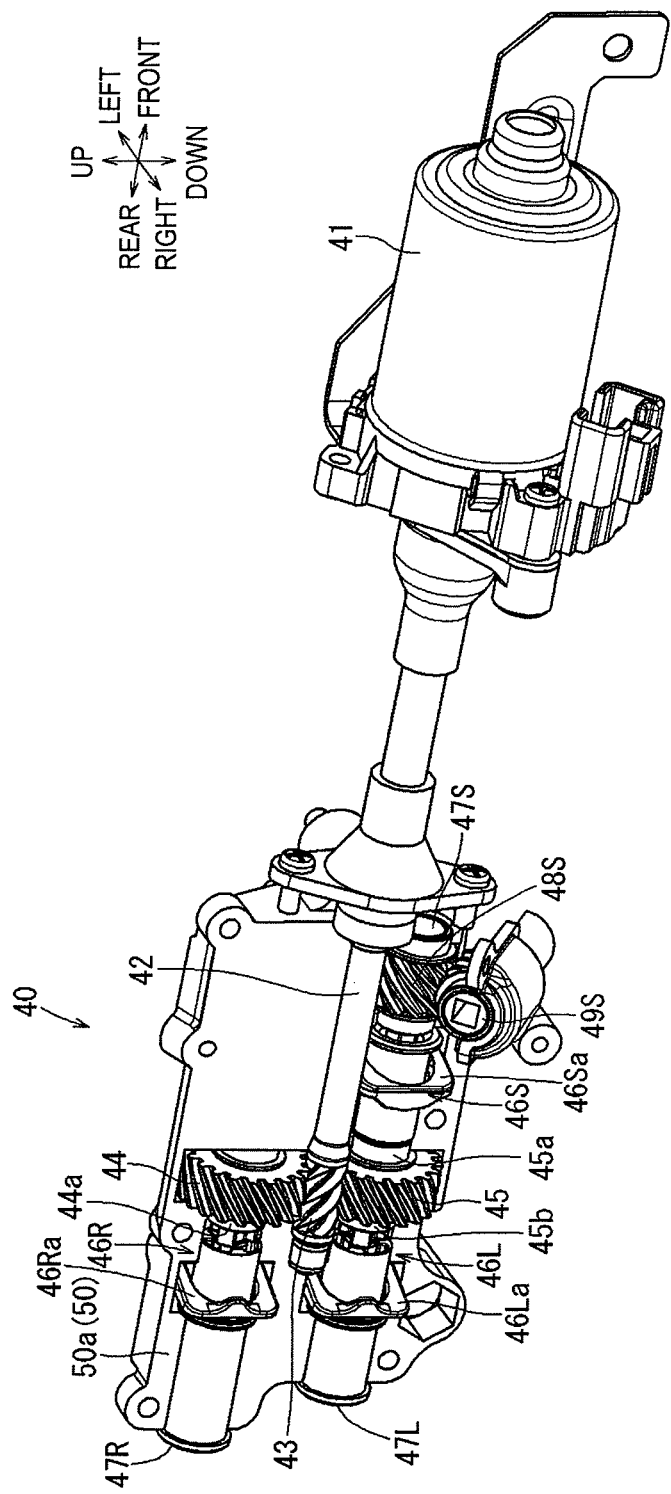
FIG. 10 is an enlarged perspective view of a driving mechanism part in the first embodiment.

The driving device 40 includes an operating mechanism part shown in FIG. 3 and a driving mechanism part shown in FIG. 10. The operating mechanism part and the driving mechanism part are arranged to overlap with each other in the left and right direction within the side shield 10, and the motor 41 of the driving mechanism part is arranged on the front side in the side shield 10 (see FIG. 1).

Figure 2:
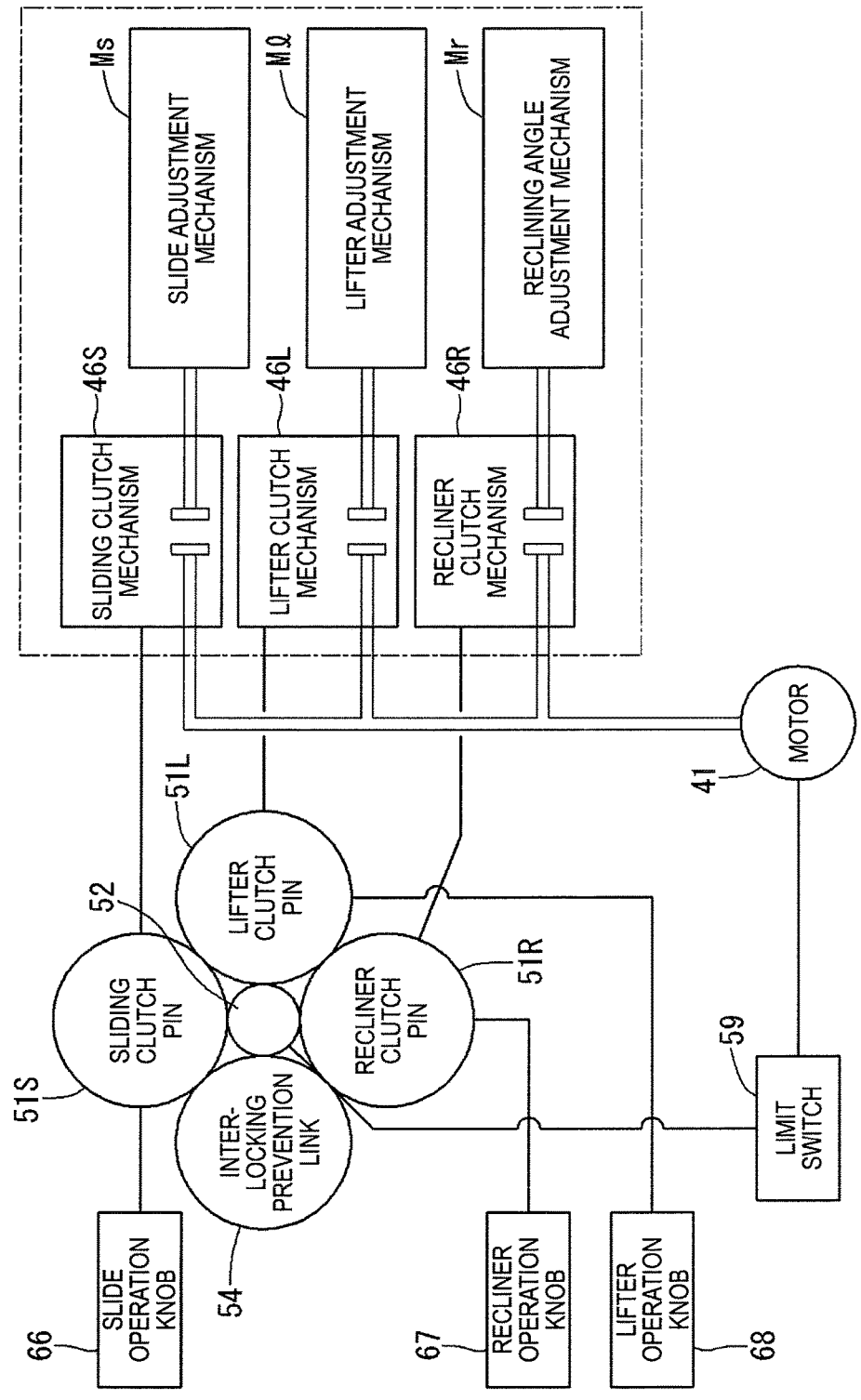
FIG. 2 is a schematic system explanatory view of the first embodiment.

As shown in FIG. 2, a slide adjustment mechanism Ms, a lifter adjustment mechanism Ml and a reclining angle adjustment mechanism Mr are connected to the motor 41 via a sliding clutch mechanism 46S, a lifter clutch mechanism 46L and a recliner clutch mechanism 46R, respectively. Therefore, each of the adjustment mechanisms Ms, Ml, Mr is operated when the motor 41 is operated and the corresponding one of the clutch mechanism 46S, 46L, 46R is brought into a connected state. Each of the sliding clutch mechanism 46S, the lifter clutch mechanism 46L and the recliner clutch mechanism 46R is a clutch mechanism which is normally in a non-connected state, and is brought into a connected state when a sliding clutch pin 51S, a lifter clutch pin 51L and a recliner clutch pin 51R are rotated, respectively. The sliding clutch pin 51S, the lifter clutch pin 51L and the recliner clutch pin 51R are rotated when the slide operation knob 66, the recliner operation knob 67 and the lifter operation knob 68 are operated to rotate, respectively.

The slide adjustment mechanism Ms, the lifter adjustment mechanism Ml or the reclining angle adjustment mechanism Mr corresponds to the first or second position adjustment mechanism in the disclosure, and the upper rail 2, the rear link 5 or the recliner corresponds to the first or second moving portion in the disclosure. Further, the sliding clutch mechanism 46S, the lifter clutch mechanism 46L or the recliner clutch mechanism 46R corresponds to the first or second clutch mechanism in the disclosure. Furthermore, the sliding clutch pin 51S, the lifter clutch pin 51L or the recliner clutch pin 51R corresponds to the first or second transmission member (third transmission member) and corresponds to the first or second clutch operating body in the disclosure.

Figure 9:
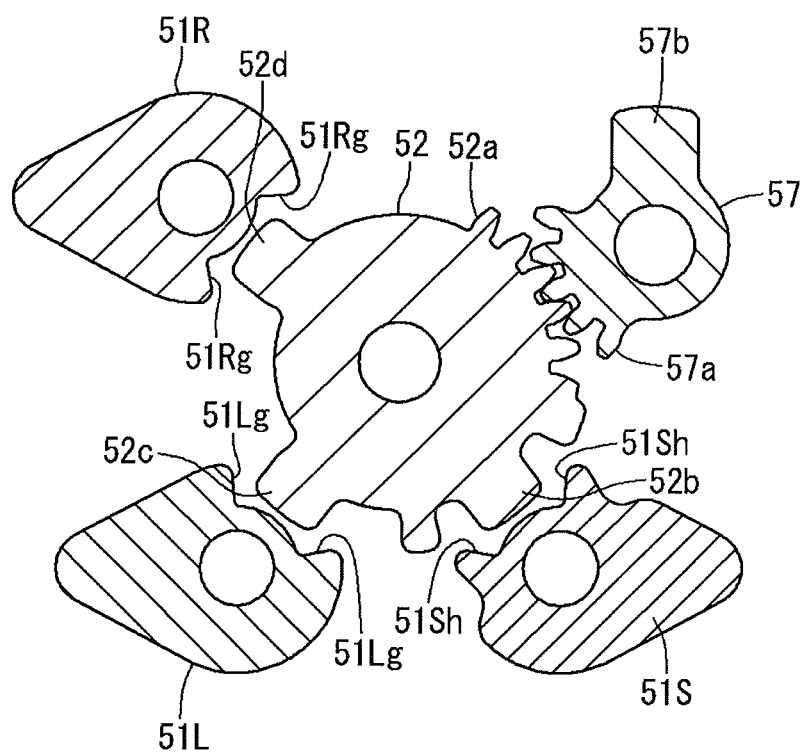
FIG. 9 is an enlarged sectional view of a center cam part of an operating mechanism in the first embodiment.

A center cam 52 which is surrounded by the sliding clutch pin 51S, the lifter clutch pin 51L and the recliner clutch pin 51R is provided. As shown in FIG. 9, projections 52b to 52d are provided in the center cam 52, respectively. Each of the projections 52b to 52d protrudes in a radial direction so as to correspond to each of the clutch pins 51S, 51L, 51R. Engaging portions 51Sh, 51Lg, 51Rg are provided so as to face each other on both sides of each of the projections 52b to 52d in a circumferential direction. When one of the sliding clutch pin 51S, the lifter clutch pin 51L and the recliner clutch pin 51R is rotated, each of the projections 52b to 52d is engaged by the engaging portions 51Sh, 51Lg, 51Rg, so that the center cam 52 is rotated.

The center cam 52 is rotated when one of the sliding clutch pin 51S, the lifter clutch pin 51L and the recliner clutch pin 51R is rotated. However, the projections 52b to 52d and the engaging portions 51Sh, 51Lg, 51Rg are separated from each other so that one of the sliding clutch pin 51S, the lifter clutch pin 51L and the recliner clutch pin 51R, which are not rotated at that time, is not rotated by the influence of the rotated center cam 52.

Figure 5:
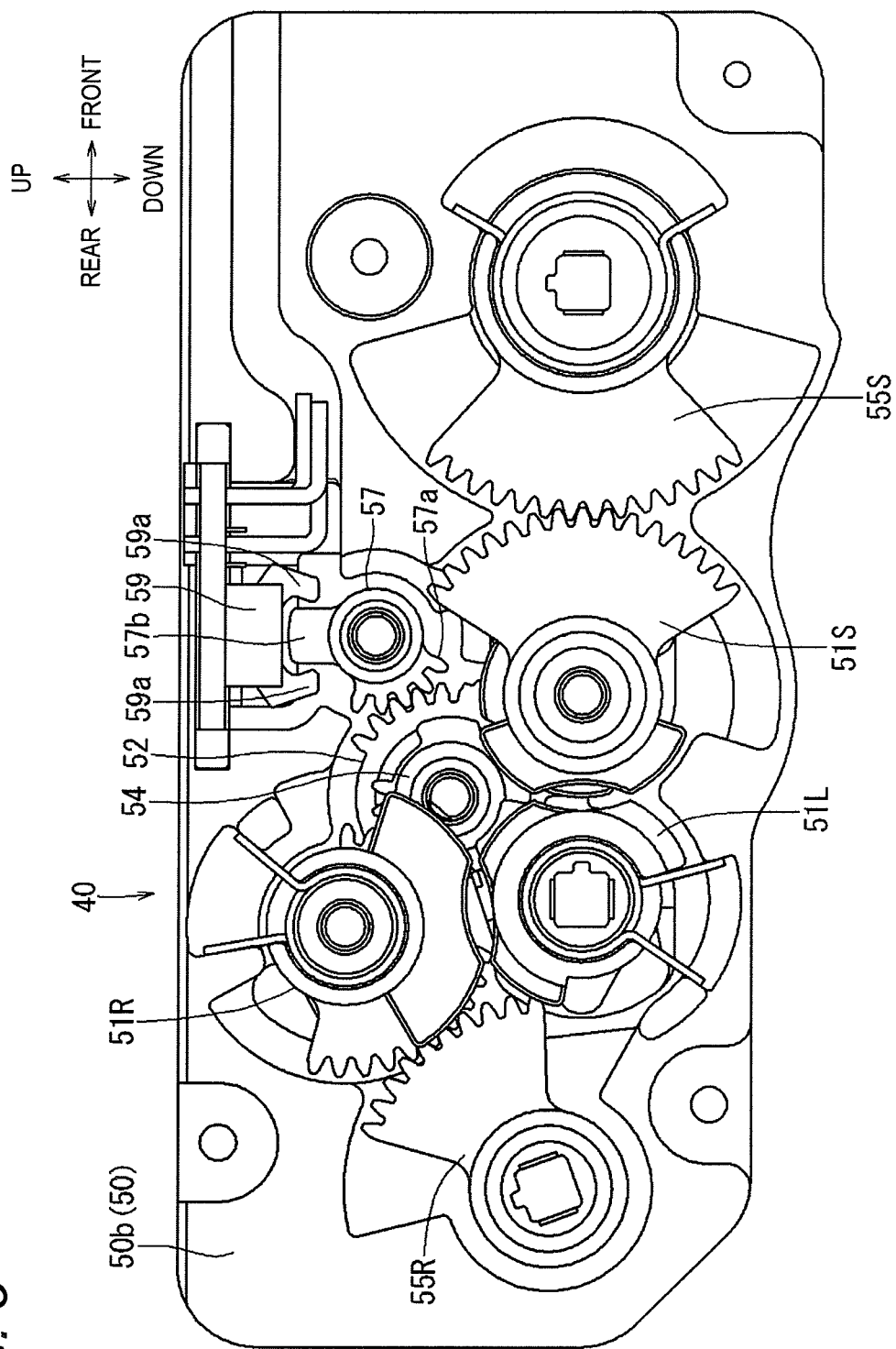
FIG. 5 is an enlarged front view of an operating mechanism part in the first embodiment.
Figure 6:
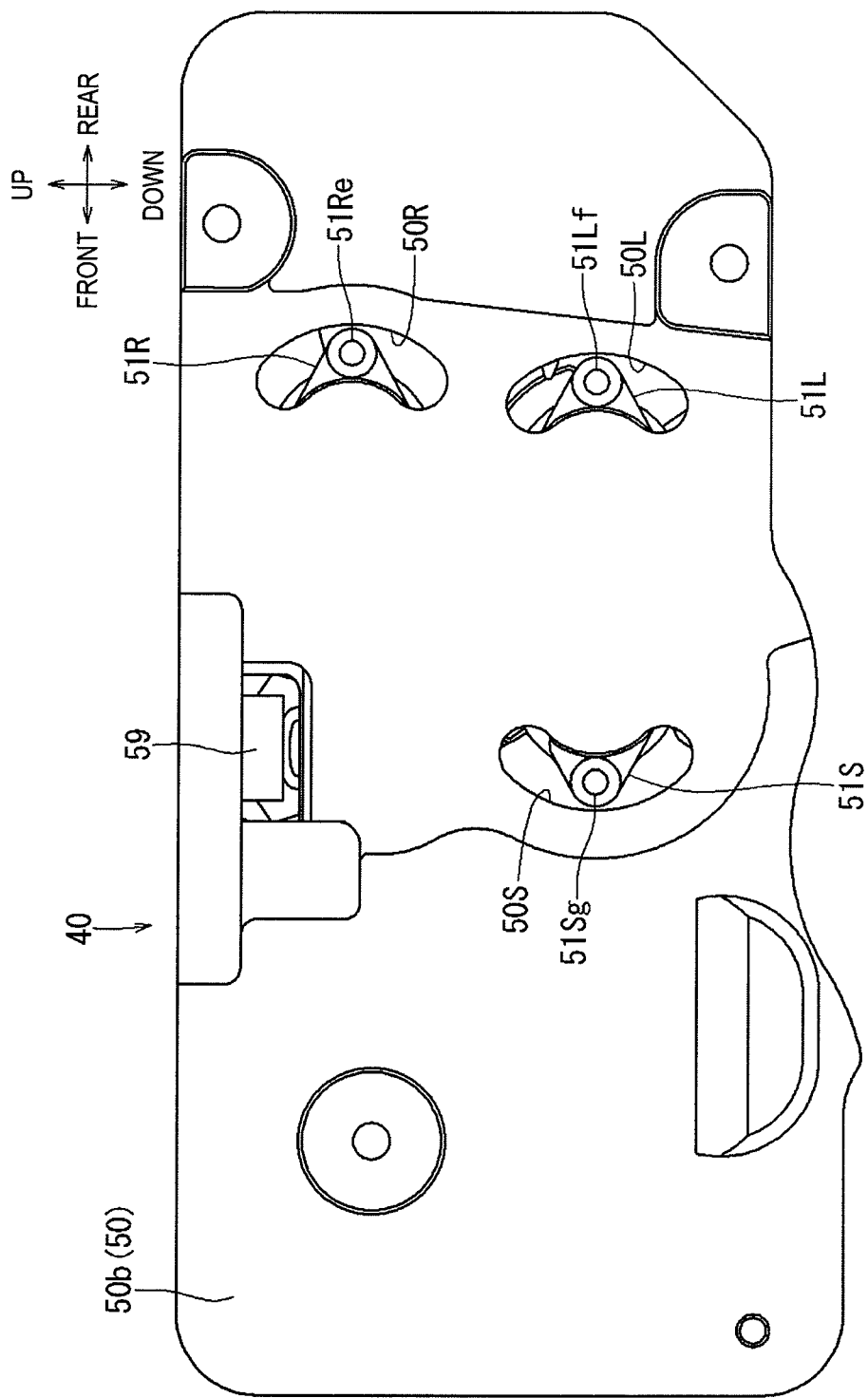
FIG. 6 is an enlarged rear view of the operating mechanism part in the first embodiment.

A gear portion 52a is formed at the position on the outer periphery of the center cam 52 where the projections 52b to 52d are not provided. A gear portion 57a of a switch link 57 is meshed with the gear portion 52a of the center cam 52. As shown in FIG. 5, when the switch link 57 is rotated in response to the rotation of the center cam 52, one of operation pieces 59a of a limit switch 59 is operated by a protruding piece 57b of the switch link 57 according to the rotation direction. The limit switch 59 is energized according to the operated operation piece 59a and is connected to an electrical circuit so as to supply power having different polarities to the motor 41 (not shown). Therefore, the motor 41 is rotationally driven in a direction corresponding to the rotation direction of the center cam 52.

As described above, the projections 52b to 52d and the engaging portions 51Sh, 51Lg, 51Rg are separated from each other, and the protruding piece 57b of the switch link 57 and each operation piece 59a of the limit switch 59 are also separated from each other. Therefore, the timing at which the limit switch 59 is energized by the rotation of one of the sliding clutch pin 51S, the lifter clutch pin 51L and the recliner clutch pin 51R is made later than the timing at which the sliding clutch mechanism 46S, the lifter clutch mechanism 46L and the recliner clutch mechanism 46R becomes a connected state.

Figure 8:
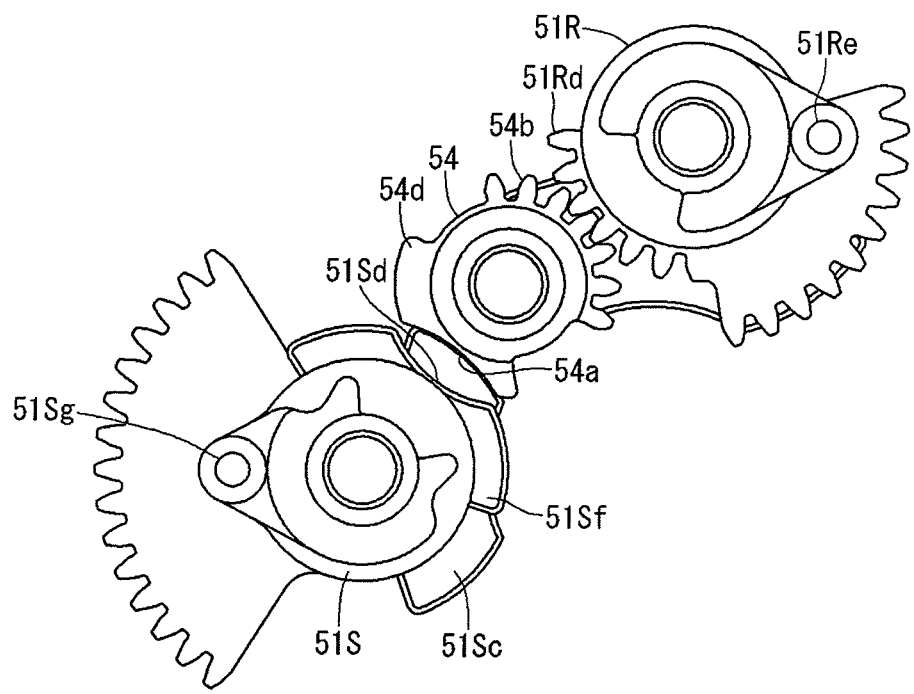
FIG. 8 is an enlarged rear view of a slide clutch pin and an interlocking prevention link in the first embodiment.

As shown in FIG. 2, an interlocking prevention link 54 is provided between the sliding clutch pin 51S and the recliner clutch pin 51R. As shown in FIG. 8 (rear view from the left side), the interlocking prevention link 54 is rotated by a gear portion 54b meshing with a gear portion 51Rd of the recliner clutch pin 51R. In a state where both the sliding clutch pin 51S and the recliner clutch pin 51R are not rotated, notches 54a and 51Sd are formed so as to face each other at positions on the outer peripheral surfaces of a flange portion 54d of the interlocking prevention link 54 and a flange portion 51Sf of the sliding clutch pin 51S facing each other. The flange portions 54d and 51Sf are formed by a part of a cylindrical portion that has a rotational center of the interlocking prevention link 54 and the sliding clutch pin 51S as its axis. The flange portion 54d of the interlocking prevention link 54 and the flange portion 51Sf of the sliding clutch pin 51S are arranged such that respective rotational trajectories thereof overlap with each other.

The interlocking prevention link 54 corresponds to the second transmission member (connection member) in the disclosure. Further, the notch 51Sd and 54a corresponds to the first and second notch in the disclosure, and the flange portion 51Sf or 54d corresponds to the first or second operation restricting portion in the disclosure.

Figure 4:
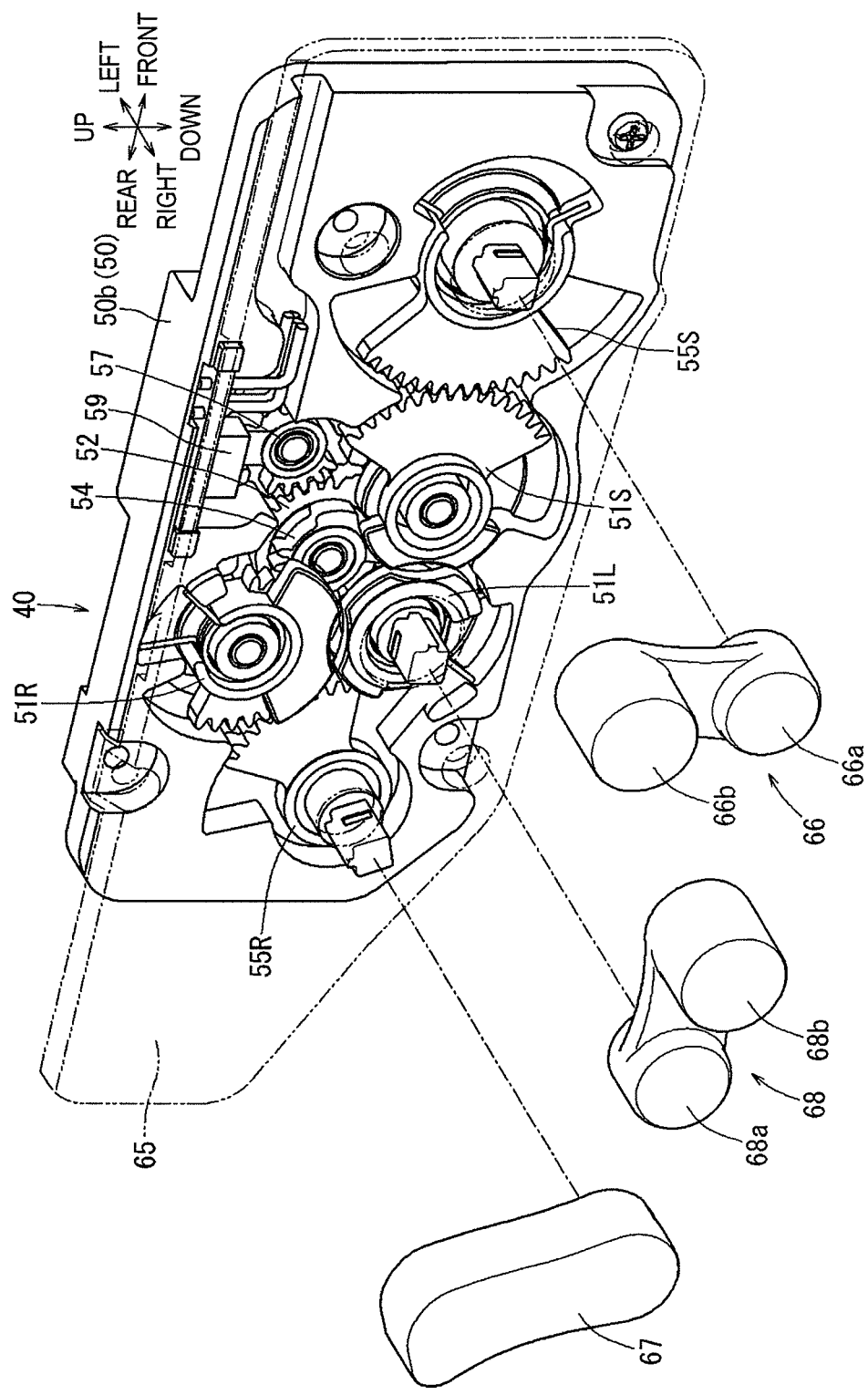
FIG. 4 is an exploded perspective view of a main part of the first embodiment.

As shown in FIGS. 3 to 5, each of the slide operation knob 66 and the lifter operation knob 68 is an operation knob of the type in which operation portions 66b, 68b are rotated around hinge portions 66a, 68a. The hinge portion 66a of the slide operation knob 66 is engaged with a rotation center portion of a sliding drive gear 55S in the rotation direction. As the operation portion 66b is rotated, the sliding drive gear 55S is rotated. The sliding drive gear 55S is meshed so as to rotate the sliding clutch pin 51S. Therefore, by operating the slide operation knob 66, the sliding clutch pin 51S is operated via the sliding drive gear 55S.

The hinge portion 68a of the lifter operation knob 68 is engaged with a rotation center portion of the lifter clutch pin 51L in the rotation direction. As the operation portion 68b is rotated, the lifter clutch pin 51L is rotated. Therefore, the lifter clutch pin 51L is operated by the operation of the lifter operation knob 68.

The recliner operation knob 67 has a shape which is similar to the shape of the seat back 8 as seen in a front view and is an operation knob of the type in which an upper portion is pivoted about a lower end portion. The lower end portion of the recliner operation knob 67 is engaged with a rotation center portion of a recliner drive gear 55R in the rotation direction. As the upper portion of the recliner operation knob 67 is rotated, the recliner drive gear 55R is rotated. The recliner drive gear 55R is meshed so as to rotate the recliner clutch pin 51R. Therefore, by operating the recliner operation knob 67, the recliner clutch pin 51R is operated via the recliner drive gear 55R.

The right side of the sliding clutch pin 51S, the lifter clutch pin 51L and the recliner clutch pin 51R is covered with a switch cover 65. Therefore, the switch cover 65 is positioned on the left side of the slide operation knob 68, the slide operation knob 66 and the recliner operation knob 67, so that the inside of a gear case half 50b is not exposed to the outside.

Figure 7:
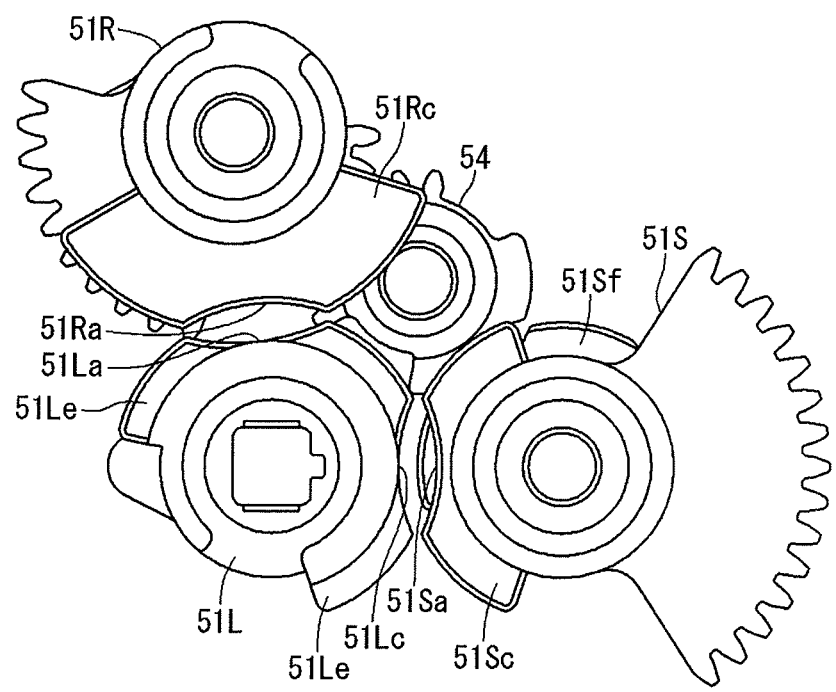
FIG. 7 is an enlarged front view of each clutch pin in the first embodiment.

As shown in FIG. 7, in a state where both the sliding clutch pin 51S and the lifter clutch pin 51L are not rotated, notches 51Sa and 51Lc are formed so as to face each other at positions on the outer peripheral surfaces of a flange portion 51Sc of the sliding clutch pin 51S and a flange portion 51Le of the lifter clutch pin 51L facing each other. The flange portions 51Sc and 51Le are formed by a part of a cylindrical portion that has a rotational center of the sliding clutch pin 51S and the lifter clutch pin 51L as its axis. The flange portion 51Sc of the sliding clutch pin 51S and the flange portion 51Le of the lifter clutch pin 51L are arranged such that respective rotational trajectories thereof overlap with each other.

Similarly, in a state where both the lifter clutch pin 51L and the recliner clutch pin 51R are not rotated, notches 51La and 51Ra are formed so as to face each other at positions on the outer peripheral surfaces of the flange portion 51Le of the lifter clutch pin 51L and a flange portion 51Rc of the recliner clutch pin 51R facing each other. The flange portions 51Le and 51Rc are formed by a part of a cylindrical portion that has a rotational center of the lifter clutch pin 51L and the recliner clutch pin 51R as its axis. The flange portion 51Le of the lifter clutch pin 51L and flange portion 51Rc of the recliner clutch pin 51R are arranged such that respective rotational trajectories thereof overlap with each other.

Figure 21:
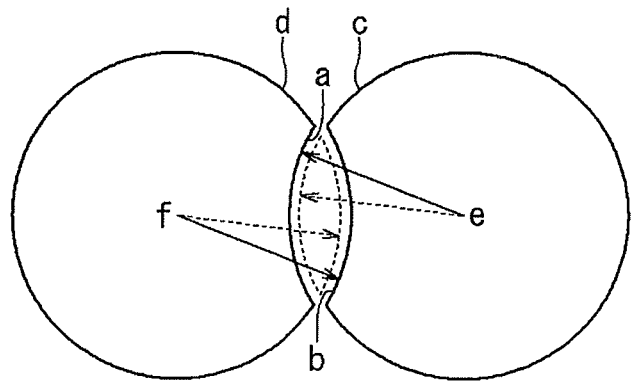
FIG. 21 is an explanatory view for explaining a method of forming a notch according to the first embodiment.

The notches 51Sa and 51Lc are formed at positions where respective outer circles of the flange portion 51Sc of the sliding clutch pin 51S and the flange portion 51Le of the lifter clutch pin 51L partially overlap with each other. Similarly, the notches 51La and 51Ra are formed at positions where respective outer circles of the flange portion 51Le of the lifter clutch pin 51L and the flange portion 51Rc of the recliner clutch pin 51R partially overlap with each other. Further, the notches 54a and 51Sd in FIG. 8 are formed at positions where respective outer circles of the flange portion 54d of the interlocking prevention link 54 and the flange portion 51Sf of the sliding clutch pin 51S partially overlap with each other. As shown in FIG. 21, each of the notches 51Sa, 51La, 54a (representatively indicated by "a" in FIG. 21) is formed along an arc that is centered on an axis "e" of each of the opposing flange portions 51Le, 51Rc, 51Sf (representatively indicated by "c" in FIG. 21). Further, each of the notches 51Lc, 51Ra, 51Sd (representatively indicated by "b" in FIG. 21) is formed along an arc that is centered on an axis "f" of each of the opposing flange portions 51Sc, 51Le, 54d (representatively indicated by "d" in FIG. 21).

As is apparent from FIG. 21, each of the notches a, b is formed by a concentric circle with each of the flange portions c, d. Therefore, the notches a, b can be easily formed close to each other within a range in which they do not interfere with the rotating flange portions c, d.

The notch 51Sa or 51Lc, or the notch 51La or 51Ra corresponds to the first or second notch in the disclosure, and the flange portion 51Sc or 51Le, or the flange portion 51Re corresponds to the first or second operation restricting portion in the disclosure.

FIG. 10 shows the driving mechanism part of the driving device 40. The driving mechanism part of the driving device 40 includes a single motor 41. The motor 41 has a single motor output shaft 42. A worm 43 is coupled to the motor output shaft 42. A pair of worm wheels 44, 45 dispersed in an up and down direction is meshed with the worm 43. Therefore, a combination of the worm 43 and the worm wheels 44, 45 causes uniaxial rotation output from the motor 41 to be converted into biaxial rotation output.

Clutch mechanisms are coupled to the rotation shafts of the worm wheels 44, 45, respectively. That is, the recliner clutch mechanism 46R is coupled to a rotation shaft (corresponding to the input shaft in the disclosure) 44a of the worm wheel 44. Further, the sliding clutch mechanism 46S is coupled to a rotation shaft (corresponding to the input shaft in the disclosure) 45a on the front side of the worm wheel 45, and the lifter clutch mechanism 46L is coupled to a rotation shaft (corresponding to the input shaft in the disclosure) 45b on the rear side of the worm wheel 45.

The clutch mechanisms 46S, 46L, 46R include operation members 46Sa, 46La, 46Ra for switching the clutch mechanisms 46S, 46L, 46R from a non-connected state to a connected state by a rocking operation, respectively. These operation members 46Sa, 46La, 46Ra are operated by the projections 51Sg, 51Lf, 51Re of the corresponding clutch pins 51S, 51L, 51R (see FIG. 6).

A helical gear 48S is coupled to an output shaft 47S of the sliding clutch mechanism 46S. A helical gear 49S having a rotary shaft arranged in a direction intersecting with a rotary shaft of the helical gear 48S is meshed with the helical gear 48S. A combination of the helical gears 48S, 49S causes an axial direction of the output shaft 47S of the sliding clutch mechanism 46S to be converted. Meanwhile, axial directions of an output shaft 47R of the recliner clutch mechanism 46R and an output shaft 47L of the lifter clutch mechanism 46L are not converted.

Members such as the clutch mechanisms 46S, 46L, 46R configuring the driving mechanism part of the driving device 40 are accommodated in a gear case half 50a (see FIG. 10). On the other hand, members such as the clutch pins 51S, 51L, 51R configuring the operating mechanism part of the driving device 40 are accommodated in a gear case half 50b (see FIGS. 3 to 6). The gear case halves 50a and 50b are superimposed in the left and right direction in such a manner that the gear case half 50a is placed on the left side, thereby forming a gear case 50 that is a single case. Therefore, the operation members 46Sa, 46La, 46Ra of the clutch mechanisms 46S, 46L, 46R are disposed at positions where they are operable by the projections 51Sg, 51Lf, 51Re of the clutch pins 51S, 51L, 51R, respectively.

Figure 11:
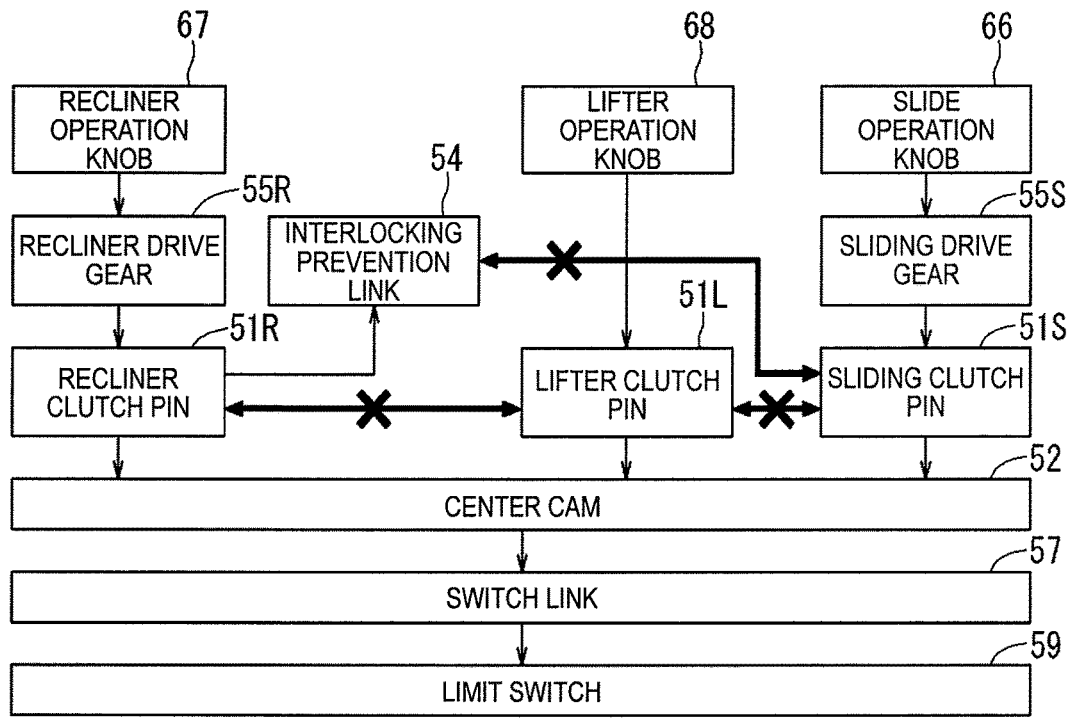
FIG. 11 is a flowchart of an operation of the seat drive device according to the first embodiment.

An operation of the first embodiment will be described with reference to FIG. 11.

When the slide operation knob 66 is operated to rotate, the sliding clutch pin 51S is rotated via the sliding drive gear 55S and the sliding clutch mechanism 46S is brought into a connected state. Since the center cam 52 is also rotated when the sliding clutch pin 51S is rotated, the limit switch 59 is switched to an energized state via the switch link 57. Therefore, the motor 41 is rotated in a direction corresponding to the rotation direction of the slide operation knob 66, and the slide adjustment mechanism Ms is actuated via the sliding clutch mechanism 46S.

Similarly, also when the recliner operation knob 67 or the lifter operation knob 68 is operated to rotate, the recliner clutch pin 51R or the lifter clutch pin 51L is rotated, and the recliner clutch mechanism 46R or the lifter clutch mechanism 46L is brought into a connected state. At this time, the limit switch 59 is energized by the rotation of the center cam 52, and the motor 41 is rotated. In this way, the reclining angle adjustment mechanism Mr or the lifter adjustment mechanism Ml is actuated.

Figure 12:
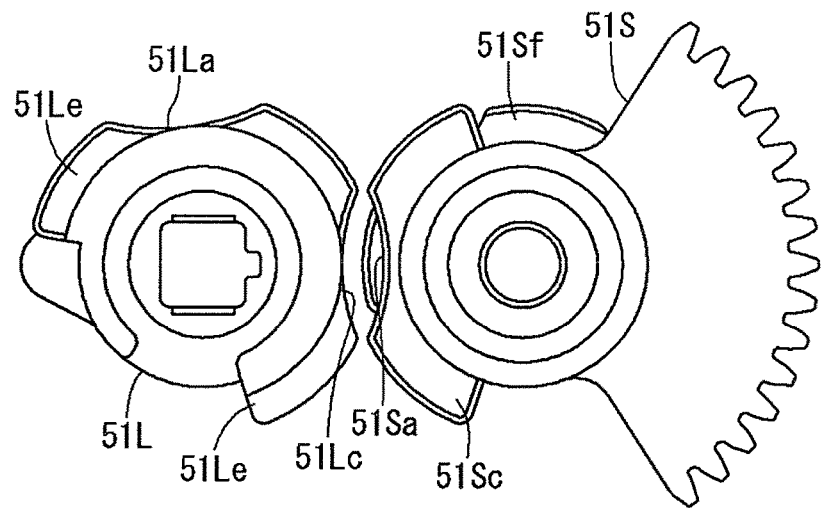
FIG. 12 is an explanatory view of an operational state of each clutch pin in the first embodiment, showing an initial state.
Figure 13:
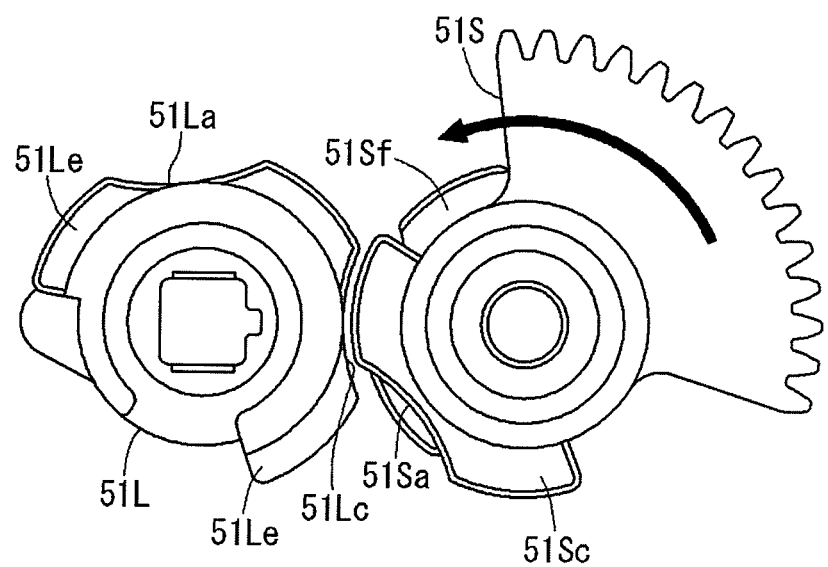
FIG. 13 is a view similar to FIG. 12, showing a state where one of the clutch pins is operated in one direction.
Figure 14:
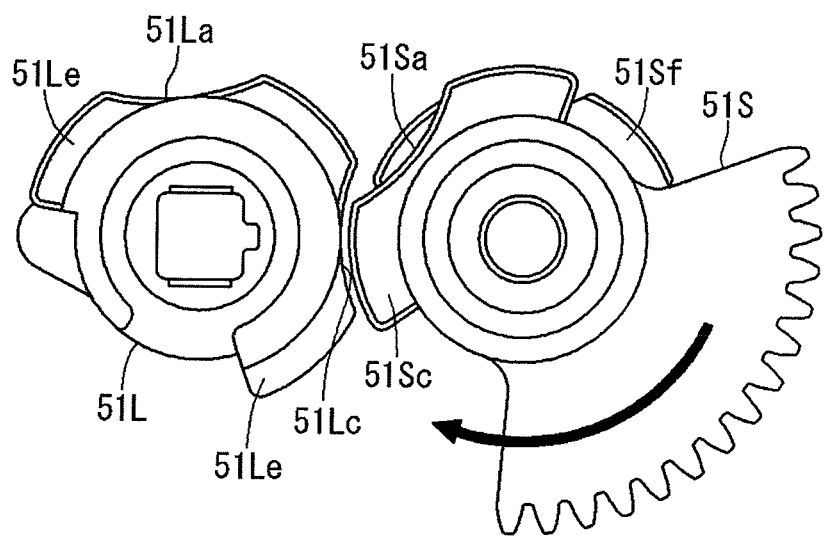
FIG. 14 is a view similar to FIG. 12, showing a state where one of the clutch pins is operated in the other direction.

When the slide operation knob 66 (the sliding clutch pin 51S) is operated to rotate as shown in FIG. 13 from a state where the recliner operation knob 67, the slide operation knob 66 (the sliding clutch pin 51S) and the lifter operation knob 68 (the lifter clutch pin 51L) are not rotated as shown in FIG. 12, the flange portion 51Sc is also rotated with the rotation of the sliding clutch pin 51S. At this time, since the lifter clutch pin 51L is not rotated and the flange portion 51Le thereof is also not rotated, the flange portion 51Sc on both sides of the notch 51Sa can freely move within the notch 51Lc of the flange portion 51Le. FIG. 14 shows a case where the slide operation knob 66 (the sliding clutch pin 51S) is rotated in the opposite direction to the case of FIG. 13. In a state where the recliner operation knob 67 and the lifter operation knob 68 are not operated as described above, the slide operation knob 66 can freely be rotated and the slide adjustment mechanism Ms can be actuated, irrespective of the rotation direction.

In a state where the slide operation knob 66 is operated to rotate in this way, the operation of the recliner operation knob 67 or the lifter operation knob 68 is prevented. For example, when the lifter operation knob 68 is operated in the state shown in FIG. 13 or 14, the flange portion 51Le of the lifter clutch pin 51L interferes with the flange portion 51Sc of the sliding clutch pin 51S that has entered the notch 51Lc. In FIG. 11, the symbol "x" between the lifter clutch pin 51L and the sliding clutch pin 51S indicates that interference occurs between the lifter clutch pin 51L and the sliding clutch pin 51S and simultaneous rotation of both is restricted.

Further, in a state where the slide operation knob 66 is operated to rotate, the interlocking prevention link 54 is also affected as shown in FIG. 8. That is, the flange portion 51Sf of the sliding clutch pin 51S enters the notch 54a of the flange portion 54d of the interlocking prevention link 54. When the recliner operation knob 67 is operated at that state, the interlocking prevention link 54 is rotated via the recliner clutch pin 51R, but the flange portion 54d of the interlocking prevention link 54 interferes with the flange portion 51Sf of the sliding clutch pin 51S which has entered the notch 54a. In FIG. 11, the symbol "x" between the sliding clutch pin 51S and the interlocking prevention link 54 indicates that interference occurs between the sliding clutch pin 51S and the interlocking prevention link 54 and simultaneous rotation of both is restricted.

When the recliner operation knob 67 is operated to rotate (see FIG. 7) in a state where the slide operation knob 66 and the lifter operation knob 68 are not operated, the flange portion 51Rc of the recliner clutch pin 51R enters the notch 51La of the flange portion 51Le of the lifter clutch pin 51L. When the lifter operation knob 68 is operated at that state, the flange portion 51Le of the lifter clutch pin 51L interferes with the flange portion 51Rc of the recliner clutch pin 51R and the rotation operation of the lifter operation knob 68 is prevented. In FIG. 11, the symbol "x" between the recliner clutch pin 51R and the lifter clutch pin 51L indicates that interference occurs between the recliner clutch pin 51R and the lifter clutch pin 51L and simultaneous rotation of both is restricted.

Further, when the recliner operation knob 67 is operated to rotate, the interlocking prevention link 54 is also affected as shown in FIG. 8. That is, the flange portion 54d of the interlocking prevention link 54 enters the notch 51Sd of the flange portion 51Sf of the sliding clutch pin 51S. When the slide operation knob 66 is operated at that state, the flange portion 51Sf of the sliding clutch pin 51S interferes with the flange portion 54d of the interlocking prevention link 54 and the rotation operation of the slide operation knob 66 is prevented. In FIG. 11, the symbol "x" between the sliding clutch pin 51S and the interlocking prevention link 54 indicates that interference occurs between the sliding clutch pin 51S and the interlocking prevention link 54 and simultaneous rotation of both is restricted.

When the lifter operation knob 68 is operated to rotate (see FIG. 7) in a state where the slide operation knob 66 and the recliner operation knob 67 are not operated, the flange portion 51Le of the lifter clutch pin 51L enters the notch 51Sa of the flange portion 51Sc of the sliding clutch pin 51S. Further, the flange portion 51Le of the lifter clutch pin 51L enters the notch 51Ra of the flange portion 51Rc of the recliner clutch pin 51R. When the slide operation knob 66 is operated at that state, the flange portion 51Sc of the sliding clutch pin 51S interferes with the flange portion 51Le of the lifter clutch pin 51L, and the rotation operation of the slide operation knob 66 is prevented. In FIG. 11, the symbol "x" between the lifter clutch pin 51L and the sliding clutch pin 51S indicates that interference occurs between the lifter clutch pin 51L and the sliding clutch pin 51S and simultaneous rotation of both is restricted. Further, when the recliner operation knob 67 is operated at that state, the flange portion 51Rc of the recliner clutch pin 51R interferes with the flange portion 51Le of the lifter clutch pin 51L, and the rotation operation of the recliner operation knob 67 is prevented. In FIG. 11, the symbol "x" between the recliner clutch pin 51R and the lifter clutch pin 51L indicates that interference occurs between the recliner clutch pin 51R and the lifter clutch pin 51L and simultaneous rotation of both is restricted.

Figure 15:
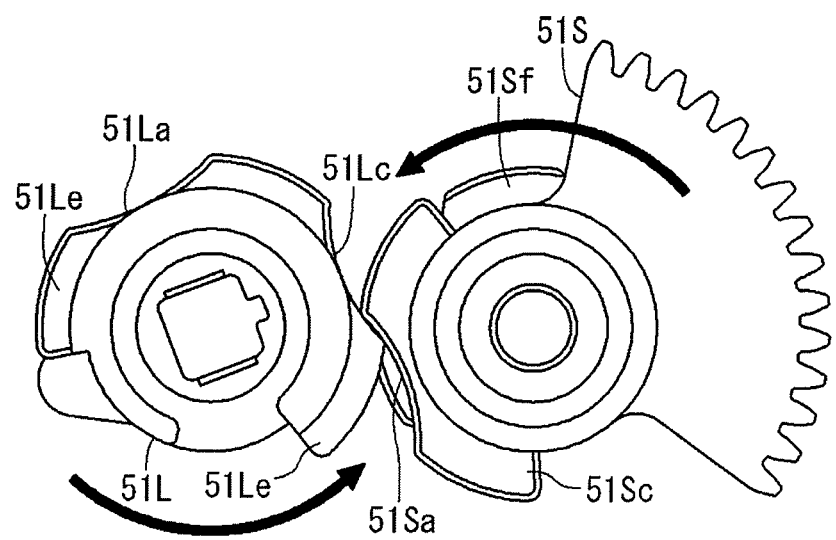
FIG. 15 is a view similar to FIG. 12, showing a state where each of the clutch pins is operated in one direction.
Figure 16:
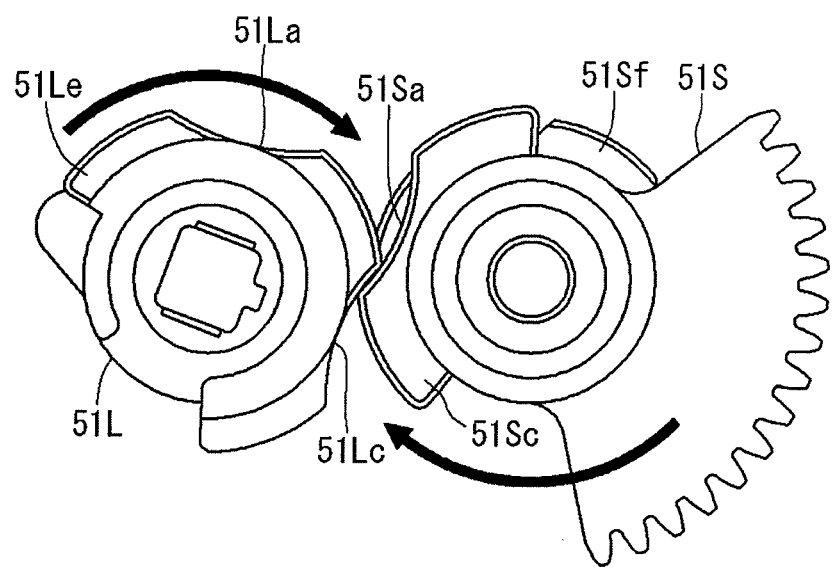
FIG. 16 is a view similar to FIG. 12, showing a state where each of the clutch pins is operated in the other direction.

In the case of the present embodiment, the slide operation knob 66, the recliner operation knob 67 and the lifter operation knob 68 are configured so that a plurality of the operation knobs is prevented from being simultaneously operated and a plurality of position adjustment mechanisms is prevented from being simultaneously operated under any circumstances. For example, FIGS. 15 and 16 show a case where the slide operation knob 66 (the sliding clutch pin 51S) and the lifter operation knob 68 (the lifter clutch pin 51L) are simultaneously operated in the same direction and at the same amount as indicated by arrows. In FIGS. 15 and 16, the operation directions of the operation knobs 66, 68 (the clutch pins 51S, 51L) are reversed. In this case, the flange portion 51Sc of the sliding clutch pin 51S and the flange portion 51Le of the lifter clutch pin 51L interfere with each other so as to engage with each other, and the simultaneous operation of the slide adjustment mechanism Ms and the lifter adjustment mechanism Ml is prevented.

Figure 17:
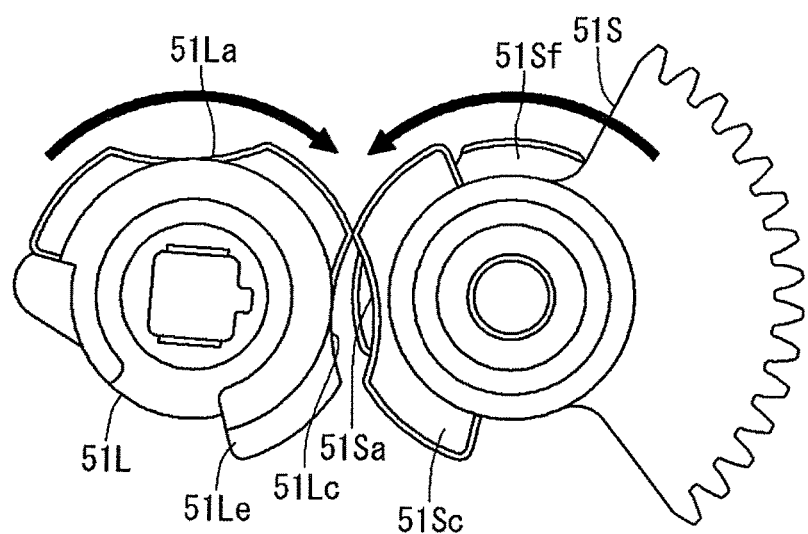
FIG. 17 is a view similar to FIG. 12, showing a state where one of the clutch pins is operated in one direction and the other of the clutch pins is operated in the other direction.

Further, FIG. 17 shows a case where the slide operation knob 66 (the sliding clutch pin 51S) and the lifter operation knob 68 (the lifter clutch pin 51L) are simultaneously operated in the opposite directions and at the same amount as indicated by arrows. In this case, the flange portion 51Sc of the sliding clutch pin 51S and the flange portion 51Le of the lifter clutch pin 51L interfere with each other so as to collide with each other and the simultaneous operation of the slide adjustment mechanism Ms and the lifter adjustment mechanism Ml is prevented.

Figure 18:
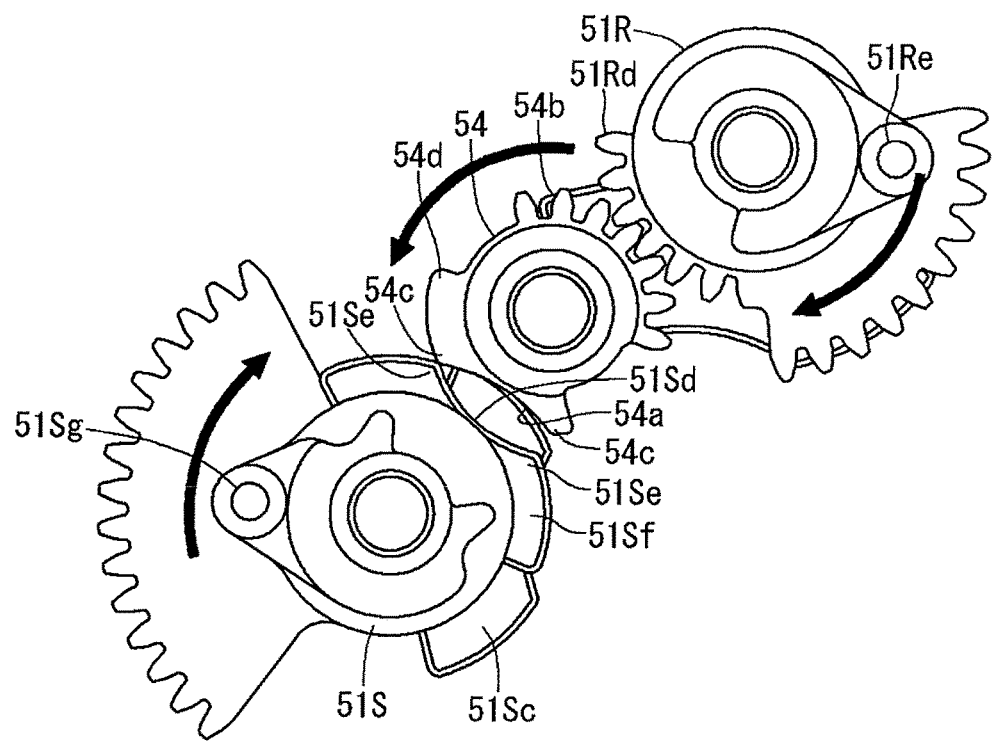
FIG. 18 is an explanatory view of an operational state of the slide clutch pin and the interlocking prevention link in the first embodiment, showing a state where the interlocking prevention link is operated in one direction and the slide clutch pin is operated in the other direction.

FIG. 18 shows a case where the slide operation knob 66 (the sliding clutch pin 51S) and the recliner operation knob 67 (the recliner clutch pin 51R) are simultaneously operated in the same direction and at the same amount as indicated by arrows. In this case, the flange portion 51Sf of the sliding clutch pin 51S and the flange portion 54d of the interlocking prevention link 54 interfere with each other so as to collide with each other and the simultaneous operation of the slide adjustment mechanism Ms and the reclining angle adjustment mechanism Mr is prevented.

Figure 19:
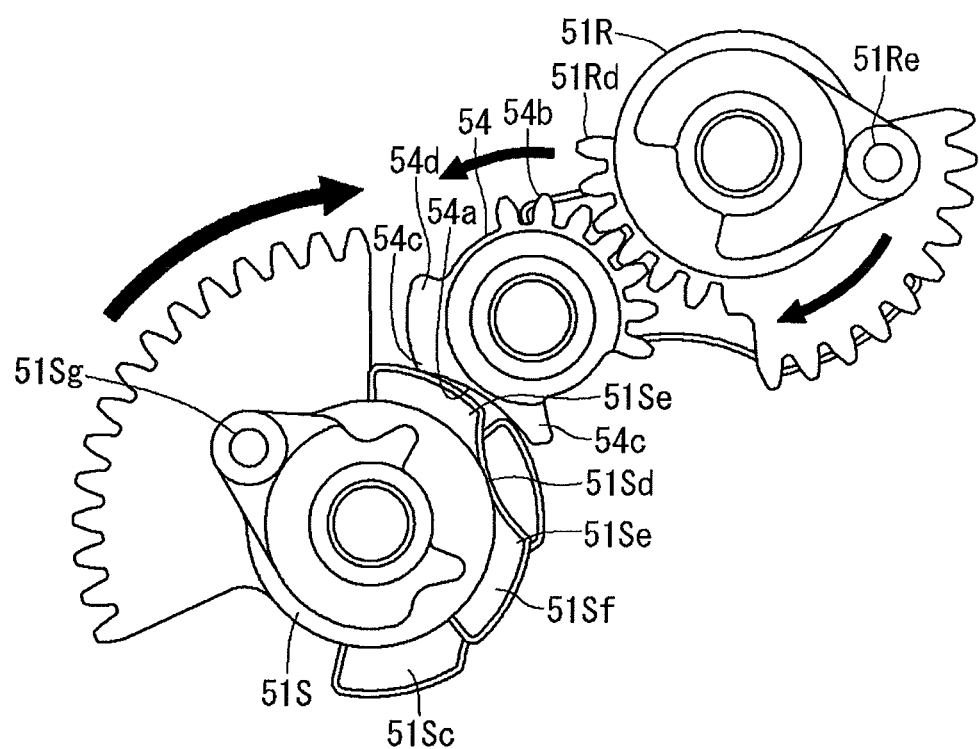
FIG. 19 is an explanatory view similar to FIG. 18, showing a state where the interlocking prevention link is operated in a small amount in one direction and the slide clutch pin is operated in a large amount in the other direction.

FIG. 19 shows a case where the slide operation knob 66 (the sliding clutch pin 51S) and the recliner operation knob 67 (the recliner clutch pin 51R) are simultaneously operated in the same direction and at different amounts as indicated by arrows. That is, this is a case where the slide operation knob 66 is operated in a larger amount than the recliner operation knob 67, i.e., the recliner operation knob 67 (the recliner clutch pin 51R) is operated in a smaller amount than the slide operation knob 66 (the sliding clutch pin 51S). In this case, the flange portion 54d of the interlocking prevention link 54 interferes with an outer peripheral surface of the flange portion 51Sf of the sliding clutch pin 51S, and the simultaneous operation of the slide adjustment mechanism Ms and the reclining angle adjustment mechanism Mr is prevented.

FIGS. 13 to 19 showed examples of the simultaneous operation of the slide operation knob 66, the recliner operation knob 67 and the lifter operation knob 68. However, even in the simultaneous operation by other combinations of the operation knobs, the simultaneous operation of a plurality of position adjustment mechanisms is prevented by interference between the respective flange portions.

Figure 20:
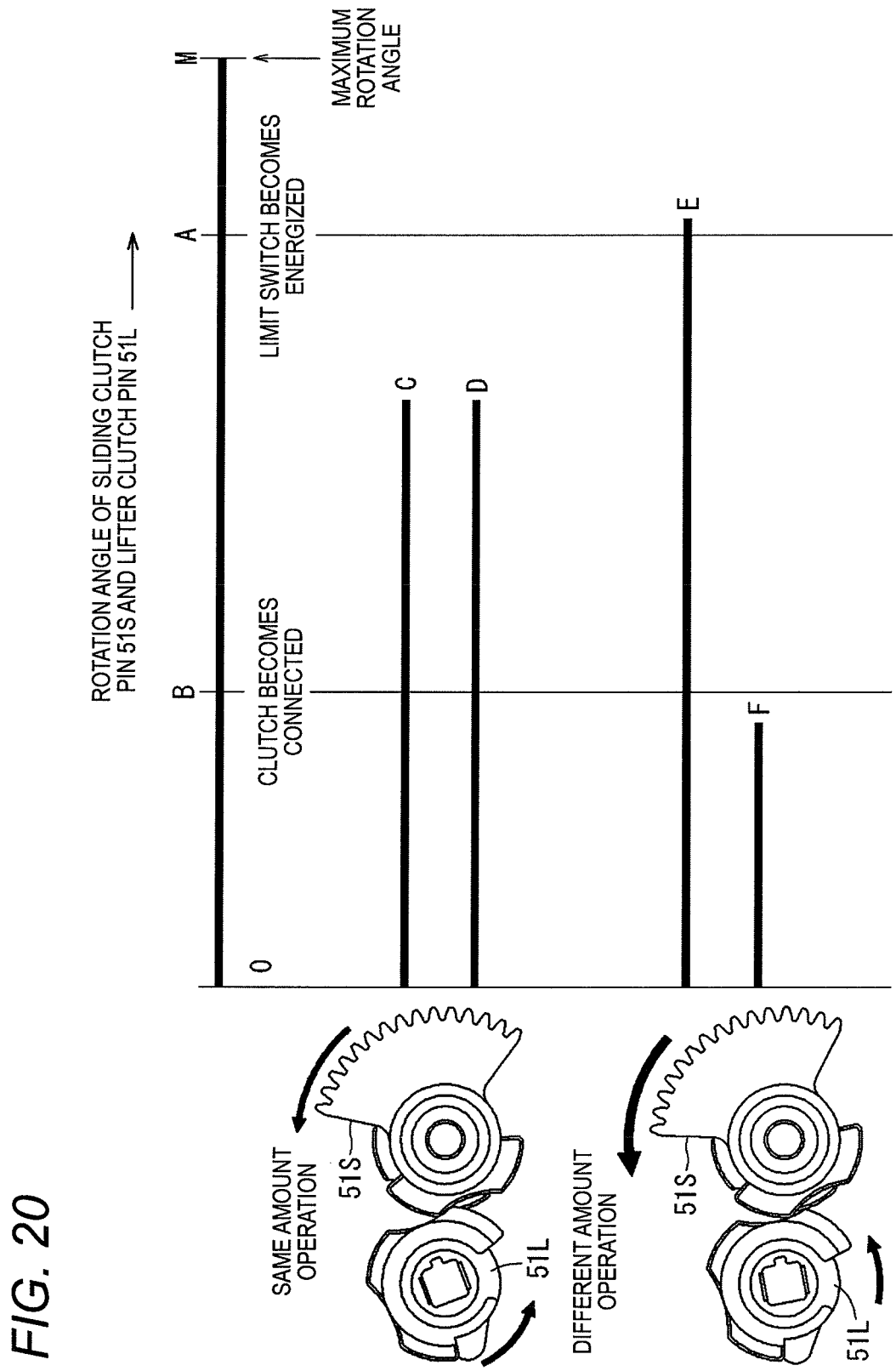
FIG. 20 is an explanatory view for explaining a state where each clutch pin is simultaneously operated.

FIG. 20 shows the switching timing of the sliding clutch mechanism 46S and the lifter clutch mechanism 46L to the connected state and the switching timing of the limit switch 59 to the energized state when the slide operation knob 66 (the sliding clutch pin 51S) and the lifter operation knob 68 (the lifter clutch pin 51L) are simultaneously operated in the same direction, similar to FIG. 15. In FIG. 20, the "B" position indicates the rotation angle at which the slide operation knob 66 and the lifter operation knob 68 are operated to rotate and the sliding clutch mechanism 46S and the lifter clutch mechanism 46L are switched to the connected state. Similarly, the "A" position indicates the rotation angle at which the limit switch 59 is switched to the energized state. Further, the "M" position indicates the maximum rotation angle of the slide operation knob 66 and the lifter operation knob 68.

When the slide operation knob 66 and the lifter operation knob 68 are simultaneously operated in the same direction and at the same amount as shown in FIG. 15 (the same amount operation shown at the upper side of FIG. 20), the sliding clutch pin 51S and the lifter clutch pin 51L can be rotated by an amount indicated by line segments C and D in FIG. 20 and further rotation thereof is prevented by interference between the flange portions 51Sc and 51Le. Since the rotation angle indicated by the line segments C and D exceeds the rotation angle of the B position, the sliding clutch mechanism 46S and the lifter clutch mechanism 46L are switched to the connected state. However, since the rotation angle indicated by the line segments C and D does not exceed the rotation angle of the A position, the limit switch 59 is not switched to the energized state. Therefore, the motor 41 is not actuated, and the slide adjustment mechanism Ms and the lifter adjustment mechanism Ml are prevented from being simultaneously operated.

That is, for the sliding clutch pin 51S and the lifter clutch pin 51L, the distance between the rotational axes of the sliding clutch pin 51S and the lifter clutch pin 51L, the outer diameters of the flange portions 51Sc and 51Le and the sizes of the arcs forming the notches 51Sa, 51Lc are determined such that the rotation angle indicated by the line segments C and D exceeds the rotation angle of the B position but does not exceed the rotation angle of the A position. Assuming that the outer diameters of the flange portions 51Sc and 51Le and the sizes of the arcs forming the notches 51Sa, 51Lc are not changed, the rotation angle indicated by the line segments C and D, at which the flange portions 51Sc and 51Le interfere with each other, can be reduced as the distance between the rotational axes of the sliding clutch pin 51S and the lifter clutch pin 51L is increased. Further, assuming that the distance between the rotational axes of the sliding clutch pin 51S and the lifter clutch pin 51L and the outer diameters of the flange portions 51Sc and 51Le are not changed, the rotation angle indicated by the line segments C and D, at which the flange portions 51Sc and 51Le interfere with each other, can be reduced as the sizes of the arcs forming the notches 51Sa, 51Lc are decreased (the closer to the arcs of the flange portions 51Le, 51Sc of the lifter clutch pin 51L and the sliding clutch pin 51S corresponding to the notches 51Sa, 51Lc).

In the case of the different amount operation shown at the lower side of FIG. 20, the slide operation knob 66 and the lifter operation knob 68 are simultaneously operated in the same direction, similar to FIG. 15. However, the operation amount of the slide operation knob 66 (the sliding clutch pin 51S) is larger than that of the lifter operation knob 68 (the lifter clutch pin 51L). In this case, the sliding clutch pin 51S is rotated by an amount indicated by the line segment E and the lifter clutch pin 51L is rotated by an amount indicated by the line segment F. Further rotation of the sliding clutch pin 51S and the lifter clutch pin 51L is prevented by interference between the flange portions 51Sc and 51Le. Since the rotation angle indicated by the line segment E exceeds both the rotation angles of the positions B and A, the sliding clutch mechanism 46S is switched to the connected state, and the limit switch 59 is also switched to the energized state. On the other hand, since the rotation angle indicated by the line segment F does not exceed both the rotation angles of the positions B and A, the sliding clutch mechanism 46S is not switched to the connected state, and the limit switch 59 is also not switched to the energized state. Therefore, the motor 41 is operated and the slide adjustment mechanism Ms is actuated. However, the lifter adjustment mechanism Ml is prevented from being operated simultaneously with the slide adjustment mechanism Ms.

That is, for the sliding clutch pin 51S and the lifter clutch pin 51L, the distance between the rotational axes of the sliding clutch pin 51S and the lifter clutch pin 51L, the outer diameters of the flange portions 51Sc and 51Le, and the sizes of the arcs forming the notches 51Sa, 51Lc are determined such that the rotation angle indicated by the line segment F does not exceed the rotation angle of the position B in a state where the slide operation knob 66 (the sliding clutch pin 51S) is operated until the rotation angle indicated by the line segment E exceeds the rotation angle of the A position. Assuming that the outer diameters of the flange portions 51Sc and 51Le and the sizes of the arcs forming the notches 51Sa, 51Lc are not changed, the rotation angle indicated by the line segment F, at which the flange portion 51Le interferes with the flange portion 51Sc, can be reduced as the distance between the rotational axes of the sliding clutch pin 51S and the lifter clutch pin 51L is increased. Further, assuming that the distance between the rotational axes of the sliding clutch pin 51S and the lifter clutch pin 51L and the outer diameters of the flange portions 51Sc and 51Le are not changed, the rotation angle indicated by the line segment F, at which the flange portion 51Le interferes with the flange portion 51Sc, can be decreased as the sizes of the arcs forming the notches 51Sa, 51Lc are reduced (the closer to the arcs of the flange portions 51Le, 51Sc of the lifter clutch pin 51L and the sliding clutch pin 51S corresponding to the notches 51Sa, 51Lc).

Although the case where the slide operation knob 66 (the sliding clutch pin 51S) and the lifter operation knob 68 (the lifter clutch pin 51L) are simultaneously operated has been described in FIG. 20, a similar function can be achieved by other combinations of the operation knobs.

Figure 22:
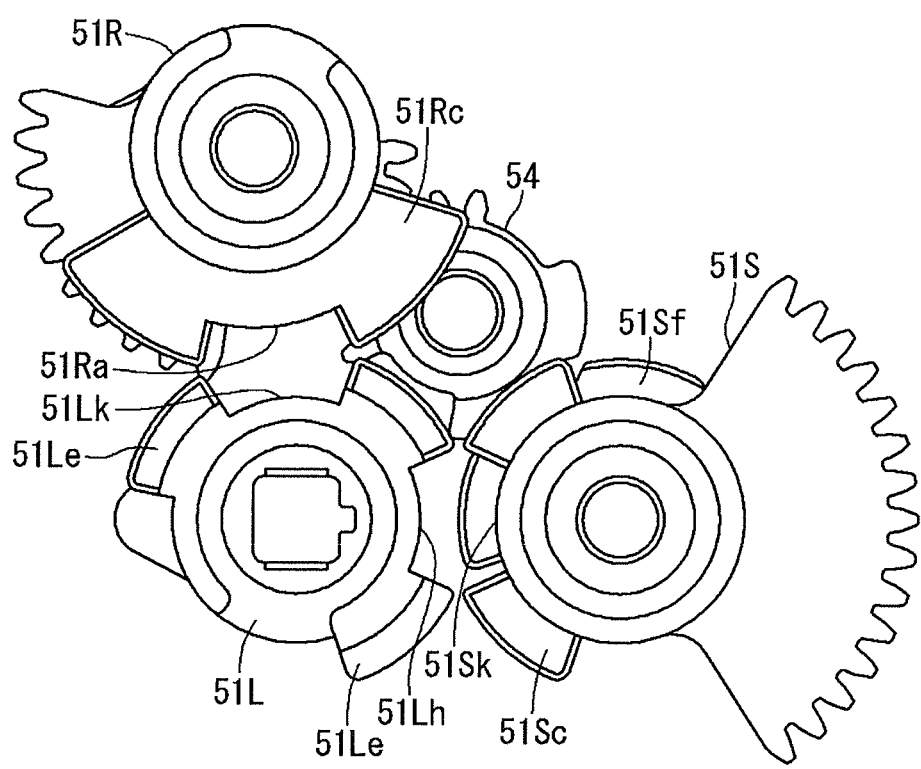
FIG. 22 is an enlarged front view of each clutch pin of a seat drive device according to a second embodiment of the disclosure.

FIG. 22 shows a second embodiment of the disclosure. The second embodiment is different from the first embodiment in that the shape of the notch is changed. Other configurations are the same in both embodiments, and the repetitive explanation of the same parts will be omitted.

In the first embodiment, the shape of each notch such as the notch 51Sa is formed along an arc centered on a rotation center of the clutch pin or the interlocking prevention link facing each notch. In contrast, notches 51Sk, 51Lh, 51Lk, 51Ra in the second embodiment shown in FIG. 22 are formed along arcs centered on rotation centers of the clutch pins 51S, 51L, 51R (or the interlocking prevention link 54) forming the notches 51Sk, 51Lh, 51Lk, 51Ra. Similar to the case of the first embodiment, the flange portions 51Sc, 51Le, 51Rc on both sides of the notches 51Sk, 51Lh, 51Lk, 51Ra correspond to the operation restricting portion in the disclosure. Therefore, the operation knobs 66, 67, 68 can be prevented from being simultaneously operated, and the corresponding adjustment mechanisms Ms, Ml, Mr can be prevented from being simultaneously operated.

Although specific embodiments have been described above, the disclosure is not limited to the appearances and configurations in these embodiments, and various modifications, additions and deletions can be made without changing the spirit of the disclosure. For example, in the above embodiments, the slide adjustment mechanism Ms, the lifter adjustment mechanism Ml, and the reclining angle adjustment mechanism Mr are provided as the first and second position adjustment mechanisms. However, at least two arbitrary position adjustment mechanisms among those adjustment mechanisms or other position adjustment mechanisms of the seat moving portion may be combined.

In the above embodiments, the interlocking prevention link 54 is provided between the recliner clutch pin 51R and the sliding clutch pin 51S. However, the interlocking prevention link 54 may be provided between other clutch pins which are difficult to be arranged adjacent to each other.

In the above embodiments, the disclosure is applied to a vehicle seat. However, the disclosure may be applied to a seat mounted on an airplane, a ship, a train, and the like, or a seat installed indoors and outdoors.

The disclosure provides illustrative, non-limiting examples as follows:

According to a first aspect, there is provided a seat drive device including: a motor having a single output shaft; a first position adjustment mechanism configured to receive an output of the motor and adjust a position of a first moving portion that is one of a plurality of seat moving portions; a second position adjustment mechanism configured to receive an output of the motor and adjust a position of a second moving portion that is one of the plurality of seat moving portions and is different from the first moving portion; a first operation member disposed corresponding to the first position adjustment mechanism and configured to be operated to move from an original position to an adjustment position when actuating the first position adjustment mechanism; a second operation member disposed corresponding to the second position adjustment mechanism and configured to be operated to move from an original position to an adjustment position when actuating the second position adjustment mechanism; a first clutch mechanism disposed corresponding to the first position adjustment mechanism and configured to selectively connect an output shaft of the first clutch mechanism which is connected to the first position adjustment mechanism and an input shaft of the first clutch mechanism which is configured to be rotated by the motor; a second clutch mechanism disposed corresponding to the second position adjustment mechanism and configured to selectively connect an output shaft of the second clutch mechanism which is connected to the second position adjustment mechanism and an input shaft of the second clutch mechanism which is configured to be rotated by the motor; a switch configured to energize the motor with a polarity corresponding to a direction of each operation of the first operation member and the second operation member in accordance with the each operation of the first operation member and the second operation member; a first transmission member provided in a path for transmitting an operating force of the first operation member to the first clutch mechanism and configured to transmit the operating force in response to the first operation member being operated to move from the original position to the adjustment position; a second transmission member provided in a path for transmitting an operating force of the second operation member to the second clutch mechanism and configured to transmit the operating force in response to the second operation member being operated to move from the original position to the adjustment position; a first operation restricting portion provided to the first transmission member and configured to, in a state where the first operation member has been operated to move from the original position to the adjustment position and the first transmission member has been operated to move in response thereto, restrict the second position adjustment mechanism from being actuated in response to the second operation member being operated to move from the original position to the adjustment position; and a second operation restricting portion provided to the second transmission member and configured to, in a state where the second operation member has been operated to move from the original position to the adjustment position and the second transmission member has been operated to move in response thereto, restrict the first position adjustment mechanism from being actuated in response to the first operation member being operated to move from the original position to the adjustment position, wherein both the first transmission member and the second transmission member are rotating bodies which are arranged adjacent to each other, wherein a first notch is provided to a rotating outer peripheral surface of the first transmission member adjacent to the second transmission member by partially cutting the rotating outer peripheral surface of the first transmission member, and the first operation restricting portion is provided to the rotating outer peripheral surface of the first transmission member adjacent to the first notch, wherein a second notch is provided to a rotating outer peripheral surface of the second transmission member adjacent to the first transmission member by partially cutting the rotating outer peripheral surface of the second transmission member, and the second operation restricting portion is provided to the rotating outer peripheral surface of the second transmission member adjacent to the second notch, the second notch facing the first notch, wherein the first operation restricting portion and the second operation restricting portion are moved in accordance with the rotation of the first transmission member and the second transmission member and are arranged such that moving trajectories of the first operation restricting portion and the second operation restricting portion overlap with each other, and wherein one of the first and second operation restricting portions corresponding to one of the first and second transmission members is movable within one of the first and second notches corresponding to another of the first and second transmission members when the one of the first and second transmission members is rotated from an initial state where both of the first and second transmission members are not rotated, and the first and second operation restricting portions are arranged to interfere with each other when both of the first and second transmission members are simultaneously rotated.

In the first aspect, the first and second position adjustment mechanisms can be configured by a combination of any two of a slide adjustment mechanism for adjusting a position in a front and rear direction of a seat, a lifter adjustment mechanism for adjusting a position in an up and down direction of a seat, a tilt adjustment mechanism for adjusting a tilt angle of a seat cushion, and a reclining angle adjustment mechanism for adjusting a reclining angle of a seat back, for example. The first and second transmission members can be configured by first and second clutch operating bodies which are configured to operate the first and second clutch mechanisms by receiving an operating force of the first and second operation members. Further, the first and second transmission members can be configured by gears, links or the like that are configured to transmit an operating force of the first and second operation members to the first and second clutch mechanisms.

According to the first aspect, when the first and second operation members are simultaneously operated to move from the original position to the adjustment position, the first and second operation restricting portions interfere with each other, and the first and second position adjustment mechanisms are prevented from being simultaneously operated. Therefore, it is possible to prevent a problem that a plurality of position adjustment mechanisms is simultaneously operated by a single motor.

According to a second aspect, there is provided the seat drive device according to the first aspect, wherein the first transmission member includes a first clutch operating body which is configured to be rotated by receiving the operating force of the first operation member and configured to operate the first clutch mechanism to a connected state, and wherein the second transmission member includes a second clutch operating body which is configured to be rotated by receiving the operating force of the second operation member and configured to operate the second clutch mechanism to a connected state.

According to the second aspect, the first and second transmission members including the first and second operation restricting portions are configured by the first and second clutch operating bodies configured to operate the first and second clutch mechanisms. Therefore, the functions of the first and second operation restricting portions that restrict the first and second clutch mechanisms from being brought into a connected state can be performed without being affected by backlash in a path for transmitting an operating force from the first and second operation members to the first and second clutch mechanisms.

According to a third aspect, there is provided the seat drive device according to the first or second aspect, wherein the first transmission member includes a cylindrical portion whose axis is a rotation center of the first transmission member, wherein the second transmission member includes a cylindrical portion whose axis is a rotation center of the second transmission member, wherein the first notch is formed by an arc centered on the rotation center of the second transmission member, and wherein the second notch is formed by an arc centered on the rotation center of the first transmission member.

According to the third aspect, the first notch is formed by the arc centered on the rotation center of the second transmission member, and the second notch is formed by the arc centered on the rotation center of the first transmission member. Therefore, the radii of the arcs of the first and second notches can be set close to the radii of the outer peripheral surfaces of the first and second transmission members. In this way, the first and second operation restricting portions provided adjacent to the first and second notches can be brought close to each other when facing each other, so that the operation of the first and second transmission members can be strictly restricted.

According to a fourth aspect, there is provided the seat drive device according to any one of the first to third aspects, wherein the second transmission member includes a connection member and a third transmission member, wherein the connection member is provided adjacent to the first transmission member and the third transmission member and is coupled to one of the first and third transmission members so as to be operated to move by receiving an operating force from the one of the first and third transmission members, wherein the second notch and the second restricting portion are provided to the connection member and faces the first transmission member, and wherein the first notch and the first restricting portion are provided to the first transmission member and faces the connection member.

According to the fourth aspect, the connection member configured to be operated to move by one of the first and third transmission members is provided, and the first and second notches and the first and second operation restricting portions are provided to the connection member and the first transmission member. Therefore, it is possible to restrict the operation of the first and third transmission members even when the first and third transmission members are separated from each other, and the first and second notches and the first and second operation restricting portions cannot be provided between the first and third transmission members so as to face each other.

According to a fifth aspect, there is provided the seat drive device according to any one of the first to fourth aspects, wherein the energization of the switch by the movement operation of each of the first and second operation members is configured to be performed later than the connection of each of the first and second clutch mechanisms, and wherein, when both of the first and second transmission members are simultaneously rotated, the first and second operation restricting portions are configured to interfere with each other at a position where the switch is not energized even when both of the first and second clutch mechanisms are connected.

According to the fifth aspect, when the operation members are simultaneously operated, the switch is prevented from being energized even in a case where it is not possible to prevent the clutch mechanisms corresponding to the operation members from being simultaneously connected. In this way, it is possible to prevent a plurality of position adjustment mechanisms from being simultaneously operated.

According to a sixth aspect, there is provided the seat drive device according to any one of the first to fifth aspects, wherein the energization of the switch by the movement operation of each of the first and second operation members is configured to be performed later than the connection of each of the first and second clutch mechanisms, and wherein, when both of the first and second transmission members are simultaneously rotated, the first and second operation restricting portions are configured to interfere with each other at a position where one of the first and second clutch mechanisms is not connected even when another of the first and second clutch mechanisms is connected and the switch is energized.

According to the sixth aspect, when the operation members are simultaneously operated, the one of the clutch mechanisms is prevented from being connected even in a case where the other of the clutch mechanisms corresponding to the operation members is connected and also it is not possible to prevent the switch from being energized. In this way, it is possible to prevent a plurality of position adjustment mechanisms from being simultaneously operated.

What is claimed is:

1. A seat drive device comprising:
    a motor having a single output shaft;
    a first position adjustment mechanism configured to receive an output of the motor and adjust a position of a first moving portion that is one of a plurality of seat moving portions;
    a second position adjustment mechanism configured to receive an output of the motor and adjust a position of a second moving portion that is one of the plurality of seat moving portions and is different from the first moving portion;
    a first operation member disposed corresponding to the first position adjustment mechanism and configured to be operated to move from an original position to an adjustment position when actuating the first position adjustment mechanism;
    a second operation member disposed corresponding to the second position adjustment mechanism and configured to be operated to move from an original position to an adjustment position when actuating the second position adjustment mechanism;
    a first clutch mechanism disposed corresponding to the first position adjustment mechanism and configured to selectively connect an output shaft of the first clutch mechanism which is connected to the first position adjustment mechanism and an input shaft of the first clutch mechanism which is configured to be rotated by the motor;
    a second clutch mechanism disposed corresponding to the second position adjustment mechanism and configured to selectively connect an output shaft of the second clutch mechanism which is connected to the second position adjustment mechanism and an input shaft of the second clutch mechanism which is configured to be rotated by the motor;
    a switch configured to energize the motor with a polarity corresponding to a direction of each operation of the first operation member and the second operation member in accordance with the each operation of the first operation member and the second operation member;
    a first transmission member provided in a path for transmitting an operating force of the first operation member to the first clutch mechanism and configured to transmit the operating force in response to the first operation member being operated to move from the original position to the adjustment position;
    a second transmission member provided in a path for transmitting an operating force of the second operation member to the second clutch mechanism and configured to transmit the operating force in response to the second operation member being operated to move from the original position to the adjustment position;
    a first operation restricting portion provided to the first transmission member and configured to, in a state where the first operation member has been operated to move from the original position to the adjustment position and the first transmission member has been operated to move in response thereto, restrict the second position adjustment mechanism from being actuated in response to the second operation member being operated to move from the original position to the adjustment position; and
    a second operation restricting portion provided to the second transmission member and configured to, in a state where the second operation member has been operated to move from the original position to the adjustment position and the second transmission member has been operated to move in response thereto, restrict the first position adjustment mechanism from being actuated in response to the first operation member being operated to move from the original position to the adjustment position,
    wherein both the first transmission member and the second transmission member are rotating bodies which are arranged adjacent to each other,
    wherein a first notch is provided to a rotating outer peripheral surface of the first transmission member adjacent to the second transmission member by partially cutting the rotating outer peripheral surface of the first transmission member, and the first operation restricting portion is provided to the rotating outer peripheral surface of the first transmission member adjacent to the first notch,
    wherein a second notch is provided to a rotating outer peripheral surface of the second transmission member adjacent to the first transmission member by partially cutting the rotating outer peripheral surface of the second transmission member, and the second operation restricting portion is provided to the rotating outer peripheral surface of the second transmission member adjacent to the second notch, the second notch facing the first notch,
    wherein the first operation restricting portion and the second operation restricting portion are moved in accordance with the rotation of the first transmission member and the second transmission member and are arranged such that moving trajectories of the first operation restricting portion and the second operation restricting portion overlap with each other, and
    wherein one of the first and second operation restricting portions corresponding to one of the first and second transmission members is movable within one of the first and second notches corresponding to another of the first and second transmission members when the one of the first and second transmission members is rotated from an initial state where both of the first and second transmission members are not rotated, and the first and second operation restricting portions are arranged to interfere with each other when both of the first and second transmission members are simultaneously rotated.

2. The seat drive device according to claim 1,
    wherein the first transmission member includes a first clutch operating body which is configured to be rotated by receiving the operating force of the first operation member and configured to operate the first clutch mechanism to a connected state, and wherein the second transmission member includes a second clutch operating body which is configured to be rotated by receiving the operating force of the second operation member and configured to operate the second clutch mechanism to a connected state.

3. The seat drive device according to claim 1, wherein the first transmission member includes a cylindrical portion whose axis is a rotation center of the first transmission member, wherein the second transmission member includes a cylindrical portion whose axis is a rotation center of the second transmission member, wherein the first notch is formed by an arc centered on the rotation center of the second transmission member, and wherein the second notch is formed by an arc centered on the rotation center of the first transmission member.

4. The seat drive device according to claim 1, wherein the second transmission member includes a connection member and a third transmission member, wherein the connection member is provided adjacent to the first transmission member and the third transmission member and is coupled to one of the first and third transmission members so as to be operated to move by receiving an operating force from the one of the first and third transmission members, wherein the second notch and the second restricting portion are provided to the connection member and faces the first transmission member, and wherein the first notch and the first restricting portion are provided to the first transmission member and faces the connection member.

5. The seat drive device according to claim 1, wherein the energization of the switch by the movement operation of each of the first and second operation members is configured to be performed later than the connection of each of the first and second clutch mechanisms, and wherein, when both of the first and second transmission members are simultaneously rotated, the first and second operation restricting portions are configured to interfere with each other at a position where the switch is not energized even when both of the first and second clutch mechanisms are connected.

6. The seat drive device according to claim 1, wherein the energization of the switch by the movement operation of each of the first and second operation members is configured to be performed later than the connection of each of the first and second clutch mechanisms, and wherein, when both of the first and second transmission members are simultaneously rotated, the first and second operation restricting portions are configured to interfere with each other at a position where one of the first and second clutch mechanisms is not connected even when another of the first and second clutch mechanisms is connected and the switch is energized.

* * * * *